(12) United States Patent
Mitamura et al.

(10) Patent No.: US 9,236,954 B2
(45) Date of Patent: Jan. 12, 2016

(54) PHOTOCOUPLER WITH PROTRUSION

(71) Applicant: RENESAS ELECTRONICS CORPORATION, Kanagawa (JP)

(72) Inventors: Kazuhiro Mitamura, Kawasaki (JP); Shigeru Moribayashi, Kawasaki (JP); Ryuta Yaginuma, Kawasaki (JP)

(73) Assignee: Renesas Electronics Corporation, Kanagawa (JP)

( * ) Notice: Subject to any disclaimer, the term of this patent is extended or adjusted under 35 U.S.C. 154(b) by 101 days.

(21) Appl. No.: 14/023,027

(22) Filed: Sep. 10, 2013

(65) Prior Publication Data
US 2014/0070120 A1 Mar. 13, 2014

(30) Foreign Application Priority Data
Sep. 12, 2012 (JP) .................. 2012-200734

(51) Int. Cl.
*G02B 27/00* (2006.01)
*H04B 10/80* (2013.01)
(52) U.S. Cl.
CPC ................... *H04B 10/802* (2013.01)
(58) Field of Classification Search
CPC .................................................. H04B 10/802
USPC ......................................................... 250/551
See application file for complete search history.

(56) References Cited

U.S. PATENT DOCUMENTS

| | | | |
|---|---|---|---|
| 5,559,340 A * | 9/1996 | Nakamura et al. | 250/551 |
| 6,588,946 B1 * | 7/2003 | Mitsui | 385/92 |
| 7,009,166 B2 * | 3/2006 | Shoji | 250/214 R |
| 7,176,473 B2 | 2/2007 | Aki et al. | |
| 7,488,964 B2 * | 2/2009 | Horino | 250/551 |
| 2005/0116145 A1 * | 6/2005 | Aki et al. | 250/214.1 |

FOREIGN PATENT DOCUMENTS

| | | |
|---|---|---|
| CN | 1622327 A | 6/2005 |
| JP | 4-354379 A | 12/1992 |
| JP | 06-005905 A | 1/1994 |
| JP | 7-122779 A | 5/1995 |
| JP | 07-212077 A | 8/1995 |
| JP | 2000-294979 A | 10/2000 |
| JP | 2005-142427 A | 6/2005 |
| JP | 2005-159137 A | 6/2005 |
| TW | 201213442 A1 | 4/2012 |

OTHER PUBLICATIONS

Kiyoshi Ebina, Foundations and Applications of Optical Devices, Semiconductor Series, Jun. 2005, pp. 253 and 270, CQ Publishing.

* cited by examiner

*Primary Examiner* — Thanh Luu
(74) *Attorney, Agent, or Firm* — Foley & Lardner LLP

(57) ABSTRACT

A photocoupler comprises an input side lead frame; an output side lead frame disposed facing the input side lead frame with a gap therebetween; a light emitting device mounted on a face of the input side lead frame facing the output side lead frame side; a light receiving device mounted on a face of the output side lead frame facing the input side lead frame side, opposite to and having a gap with the light emitting device; and a protrusion disposed on at least a part of an area around the light receiving device on the output side lead frame and being formed of conductive bonding wire or a bump, protruding to the input side lead frame side.

11 Claims, 24 Drawing Sheets

PHOTOCOUPLER WITH PROTRUSION

REFERENCE TO RELATED APPLICATION

This application is based upon and claims the benefit of priority of Japanese patent application No. 2012-200734 filed on Sep. 12, 2012, the disclosure of which is incorporated herein in its entirety by reference thereto.

TECHNICAL FIELD

The present invention relates to a photocoupler having a light emitting device and a light receiving device.

BACKGROUND

A general photocoupler has a configuration in which two lead frames are disposed facing each other with a gap therebetween, a light emitting device (for example, a light emitting diode) is mounted and bonded to a lead frame on an input side, a light receiving device (for example, a light receiving IC) is mounted and bonded to a lead frame on an output side, and the light emitting device and the light receiving device are disposed facing each other and with a gap therebetween (for example, refer to FIG. 5 of Patent Document 2). In this type of photocoupler, since parasitic capacitance (floating capacitance) exists equivalently between input and output (between the light emitting device and the light receiving device), when voltage that changes suddenly due to a noise signal or a high speed switching operation is added to the parasitic capacitance, a current (displacement current) flows from the input side (the light emitting device and lead frame) to the light receiving device even when the light emitting device is not on, and an output malfunction may occur.

With regard to this malfunction, there is what is called CMR (Common Mode Rejection) as an index representing how hard it is to have a malfunction. The CMR relates to through rate of a maximum common mode voltage $V_{CM}$ that can be maintained with an output state of the photocoupler in a correct state, and is represented as a voltage change value per 1 μs (refer to Non-Patent Document 1).

In the general photocoupler as described above, a displacement current that flows, through parasitic capacitance between input and output, due to the voltage suddenly changing by a noise signal or a high speed switching operation, can be represented as in Formula 1.

$$i_d = \int_S \frac{\partial D}{\partial t} \cdot n dS = \frac{d}{dt}\int_S D \cdot n dS = \frac{d}{dt}\int_V divD dV = \quad \text{[Formula 1]}$$

$$\frac{d}{dt}\left(\int \rho dV\right) = \frac{d}{dt}(Q) = \frac{d}{dt}(CV) = C\frac{dV}{dt} = C\frac{\Delta V_{CM}}{t_r}$$

D: electric flux density
t: time
n: unit normal vector
S: conductor area
ρ: charge density on input side
Q: value of integral of charge density ρ
C: capacitance between input and output
V: voltage between input and output
$V_{CM}$: common mode voltage
$t_r$: rising time Since the through rate of the common mode voltage $V_{CM}$ is "$\Delta V_{Cm}/t_r$", if the through rate is high, a large displacement current $i_d$ flows from the input side (light emitting device side) to the output side (light receiving device side). A malfunction not occurring even if a large displacement current flows (possible to maintain an output state of the photocoupler as a correct state) means that the displacement current that is flowing does not easily enter the light receiving device.

As one method of improving the CMR characteristic, Patent Document 1 for example, discloses that a conductive polysilicon layer with translucency is formed in a light receiving part, as in the light receiving IC, and the potential of the polysilicon layer is grounded. With this method, an output malfunction is prevented by the displacement current being received by the polysilicon layer and being released to ground.

[Patent Document 1]
JP Patent Kokai Publication No. JP04-354379A
[Patent Document 2]
JP Patent Kokai Publication No. JP07-122779A
[Non-Patent Document 1]
Foundations and Applications of Optical Devices: Kiyoshi Ebina, (author and editor), (in Japanese) CQ Publishing, June 2005, pp. 253 and 270.

SUMMARY

The entire disclosures of Patent Documents 1 and 2 and Non-Patent Document 1 are incorporated herein by reference thereto. The following analysis is given by the inventors of the present application.

As described above, for a displacement current $i_d$, since "$i_d = C \cdot dV/dt = C \cdot \Delta V_{CM}/t_r$", then $i_d$ is proportional to "$dV/dt = \Delta V_{CM}/t_r$", namely, time variation of voltage between input and output due to noise or a high speed switching operation and parasitic capacitance between input and output. For a photocoupler with a small gap between input and output, the parasitic capacitance C is large and the displacement current is large in comparison to a case where the gap is large. In this case, the displacement current is not fully released by only a countermeasure by a light receiving device on an output side as in Patent Document 1, and since the displacement current that has not been fully released is amplified by a phototransistor of the light receiving device and is outputted, an output malfunction is caused. In this case, it is necessary to have a malfunction countermeasure through the photocoupler package structure.

As an example of a malfunction countermeasure through the photocoupler package structure, Patent Document 2 for example, discloses a photocoupler that includes: first and second lead frames that face each other, a light emitting device mounted on a lace opposite to the second lead frame, on the first lead frame, a light receiving device mounted on a face opposite to the face opposing the first lead frame, on the second lead frame, and a reflecting member that reflects light from the light emitting device to the light receiving device. According to this photocoupler, a displacement current does not enter the light receiving device, so that the CMR characteristic is improved.

However, in the photocoupler disclosed in Patent Document 2, since there is no light receiving device immediately below the light emitting device and light reflection is not used, a CTR (Current Transfer Ratio: ratio of output side photocurrent and input side forward current) characteristic is not good. Here, the higher the CTR the better. This is because the higher the CTR of a package, the more a current flowing in the light emitting device can be reduced, so that energy saving is possible. In the photocoupler described in Patent Document 2, since a reflecting member of a particular form is used, the manufacturing cost of the member is high. That is, in the photocoupler described in Patent Document 2, the CMR characteristic and the CTR characteristic cannot both be realized, and manufacturing cost is high.

In an aspect of the disclosure, there is provided a photocoupler comprising: an input side lead frame; an output side lead frame disposed facing the input side lead frame with a gap therebetween; a light emitting device mounted on a face of the input side lead frame facing the output side lead frame side; a light receiving device mounted on a face of the output side lead frame facing the input side lead frame side, opposite to and having a gap with the light emitting device; and a protrusion disposed on at least a part of an area around the light receiving device on the output side lead frame and being formed of conductive bonding wire or a bump, protruding to the input side lead frame side.

The meritorious effects of the present invention are summarized as follows. According to an aspect of the invention, by providing a protrusion on the output side lead frame in which the light receiving device is mounted, it is possible to reduce the amount of displacement current entering the light receiving device, without the CTR characteristic deteriorating and without manufacturing cost increasing, and it is possible to improve the CMR characteristic.

BRIEF DESCRIPTIONS OF THE DRAWINGS

PREFERRED MODES

First Exemplary Embodiment

Figure 1:
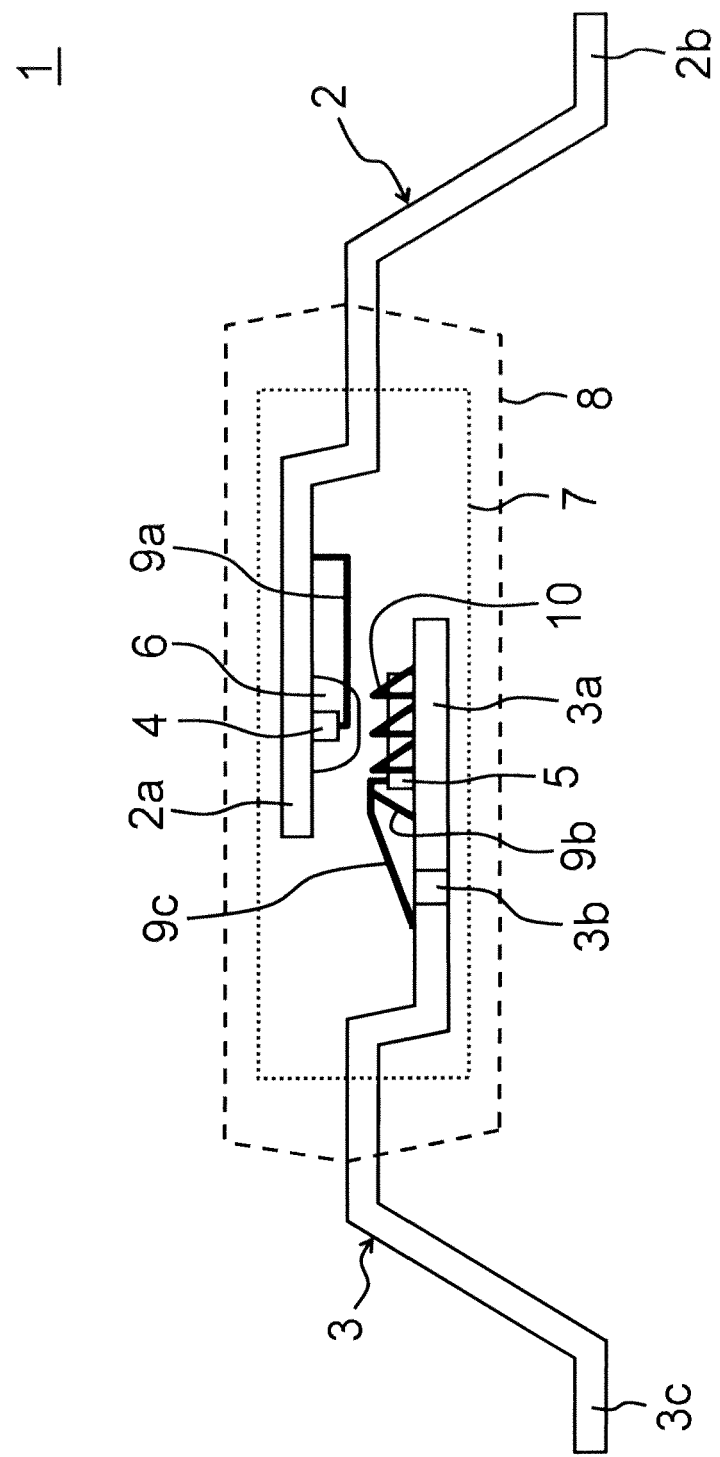
FIG. 1 is a side view schematically showing a configuration of a photocoupler according to a first exemplary embodiment.
Figure 2:
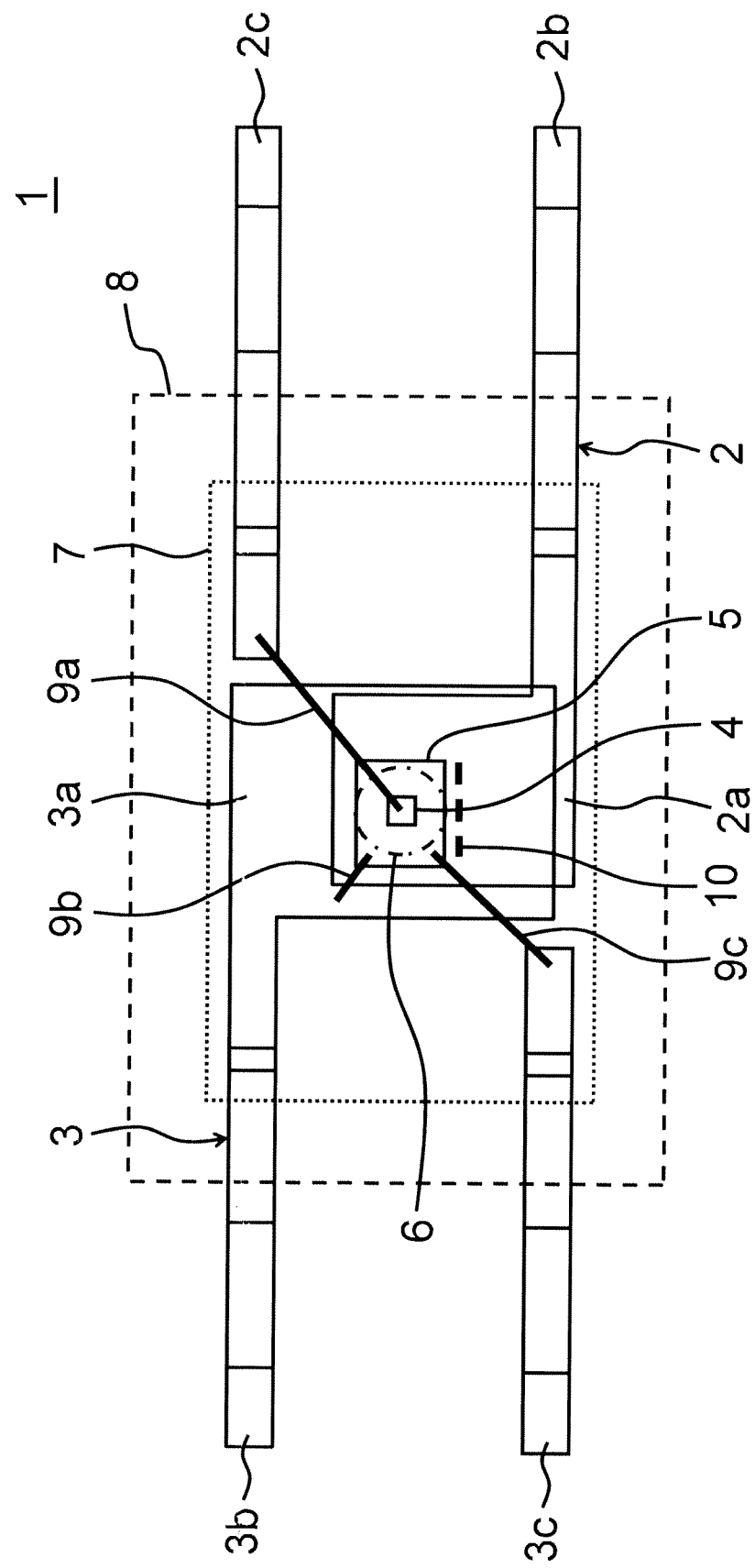
FIG. 2 is a plan view schematically showing a configuration of the photocoupler according to the first exemplary embodiment.
Figure 3:
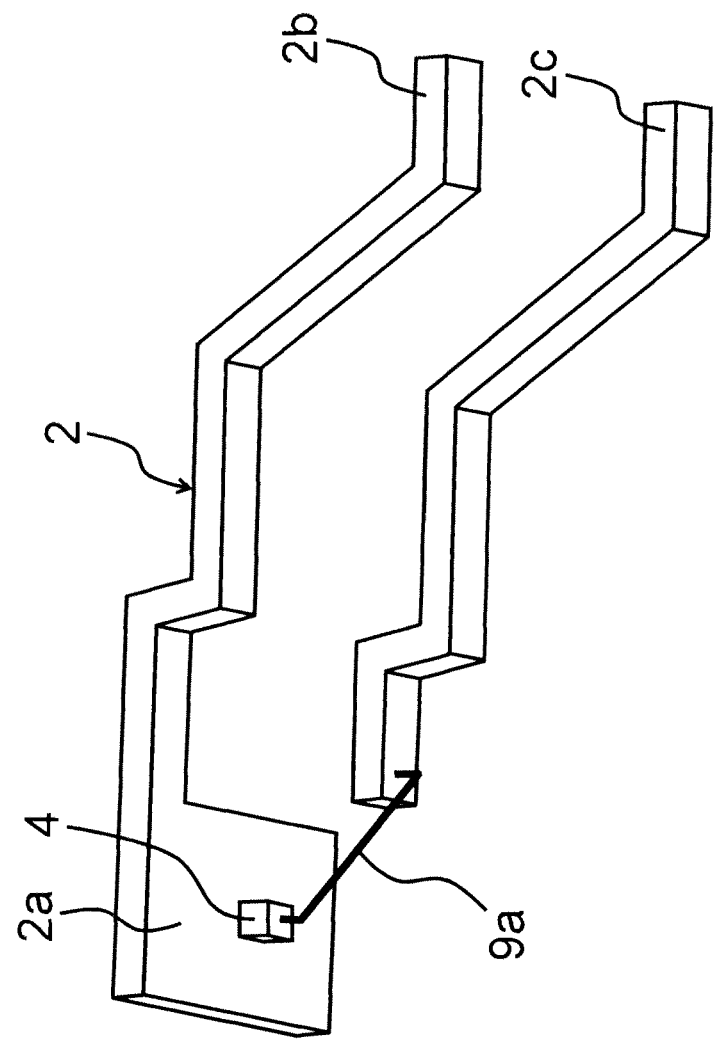
FIG. 3 is a perspective view schematically showing a configuration of an input side lead frame and a light emitting device in the photocoupler according to the first exemplary embodiment.
Figure 4:
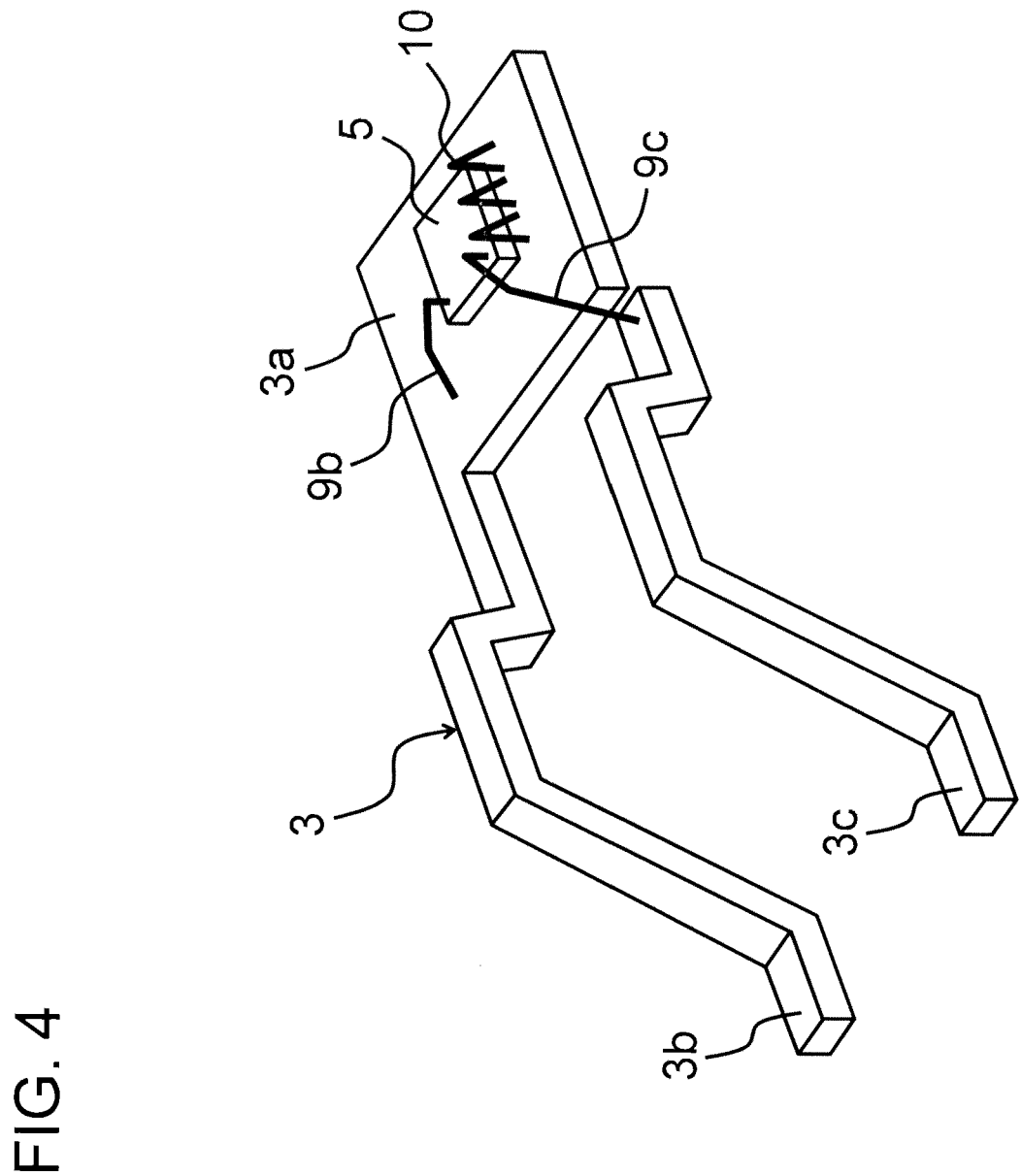
FIG. 4 is a perspective view schematically showing a configuration of an output side lead frame and a light receiving device in the photocoupler according to the first exemplary embodiment.

A description is given concerning a photocoupler according to a first exemplary embodiment of the present disclosure, making reference to the drawings. FIG. 1 is a side view schematically showing a configuration of the photocoupler according to the first exemplary embodiment. FIG. 2 is a plan view schematically showing a configuration of the photocoupler according to the first exemplary embodiment. FIG. 3 is a perspective view schematically showing a configuration of an input side lead frame and a light emitting device in the photocoupler according to the first exemplary embodiment. FIG. 4 is a perspective view schematically showing a configuration of an output side lead frame and a light receiving device in the photocoupler according to the first exemplary embodiment.

The photocoupler 1 is a device (electronic component) that converts a received electrical signal to light by a light emitting device 4, and converts the light to an electrical signal by a light receiving device 5 to output the electrical signal (refer to FIG. 1 and FIG. 2). The photocoupler 1 has a structure that houses the light emitting device 4 and the light receiving device 5 internally (inner side of a light-blocking resin 8 that blocks light from outside), and is enclosed in the light-blocking resin 8 that blocks light from outside. The photocoupler 1 has a configuration in which the light emitting device 4 is mounted and bonded to an input side lead frame 2, and the light receiving device 5 is mounted and bonded to an output side lead frame 3, in an internal arrangement where the two lead frames 2 and 3 face each other with a gap therebetween, with the light emitting device 4 and the light receiving device 5 being disposed to face each other with a gap therebetween. The photocoupler 1 has the input side lead frame 2, the output side lead frame 3, a mounting part 3a, the light emitting device 4, the light receiving device 5, transparent resin 6, translucent resin 7, the light-blocking resin 8, bonding wire 9a, 9b and 9c, and a wire protrusion 10.

The input side lead frame 2 is a lead frame that receives an electrical signal (refer to FIG. 1, FIG. 2 and FIG. 3). The input side lead frame 2 is a conductor, and for example, copper, a copper alloy, an iron alloy or the like may be used. The input side lead frame 2 has a mounting part 2a, a lead part 2b, and a lead part 2c. On the mounting part 2a, the light emitting device 4 is mounted (installed, bonded, surface mounted) facing the mounting part 3a of the output side lead frame 3, and the transparent resin 6 is mounted so as to cover the light emitting device 4. The mounting part 2a is electrically connected to a cathode of the light emitting device 4. The lead part 2b is a lead terminal drawn to the exterior of the light-blocking resin 8 from the mounting part 2a. The lead part 2b is electrically connected to a cathode of the light emitting device 4 via the mounting part 2a. The lead part 2c is a lead terminal drawn to the exterior, not connected to the mounting part 2a. The lead part 2c is electrically connected internally to an anode of the light emitting device 4 via the bonding wire 9a. With regard to the input side lead frame 2, the mounting part 2a, and some of the lead part 2b (internal portion), together with some of the lead part 2c (internal portion) are covered by the translucent resin 7; outside of the translucent resin 7, some of the lead part 2b (middle portion) and some of the lead part 2c (middle portion) are covered by the light-blocking resin 8; and outside of the light-blocking resin 8, some of the lead part 2b (external portion) and some of the lead part 2c (external portion) are exposed.

The output side lead frame 3 is a lead frame from which an electrical signal is outputted (refer to FIG. 1, FIG. 2, and FIG. 4). The output side lead frame 3 is a conductor, and for example, copper, a copper alloy, an iron alloy or the like may be used The output side lead frame 3 has the mounting part 3a, the lead part 3b, and the lead part 3c. On the mounting part 3a the light receiving device 5 is mounted (installed, bonded, surface mounted) facing the mounting part 2a of the input side lead frame 2. The mounting part 2a is electrically connected to an emitter of the light receiving device 5 via the bonding wire 9b. One or a plurality of wire protrusions 10 are provided in some (a prescribed portion) of an area around the light receiving device 5, and the mounting part 2a is electrically connected to the wire protrusion 10. The lead part 3b is a lead terminal drawn to the exterior of the light-blocking resin 8 from the mounting part 3a. The lead part 3b is electrically connected to an emitter of the light receiving device 5 via the mounting part 3a and the bonding wire 9b. The mounting part 3b is electrically connected to the wire protrusion 10 via the mounting part 3a. The lead part 3c is a lead terminal drawn to the exterior, not connected to the mounting part 3a. The lead part 3c is electrically connected internally to a collector of the light receiving device 5 via the bonding wire 9c. With regard to the output side lead frame 3, the mounting part 3a, and some of the lead part 3b (internal portion), together with some of the lead part 3c (internal portion) are covered by the translucent resin 7; outside of the translucent resin 7, some of the lead part 3b (middle portion) and some of the lead part 3c (middle portion) are covered by the light-blocking resin 8; and outside of the light-blocking resin 8, some of the lead part 3b (external portion) and some of the lead part 3c (external portion) are exposed.

The light emitting device 4 is a device that converts a received electrical signal into light (refer to FIG. 1, FIG. 2 and FIG. 3). A light emitting diode may be used, for example, in the light emitting device 4. The light emitting device 4 is disposed to face the light receiving device 5. The light emitting device 4 is mounted (installed, bonded, surface mounted) facing the mounting part 3a of the output side lead frame 3, on the mounting part 2a of the input side lead frame 2, and is covered by the translucent resin 7 via the transparent resin 6. With regard to the light emitting device 4, a cathode is electrically connected to the mounting part 2a and lead part 2b of the input side lead frame 2, and an anode is electrically connected to the lead part 2c via the bonding wire 9a.

The light receiving device 5 is a device that converts incident light into an electrical signal (refer to FIG. 1, FIG. 2 and FIG. 4). A phototransistor, for example, may be used in the light receiving device 5. The light receiving device 5 is disposed to face the light emitting device 4. The light receiving device 5 is mounted (installed, bonded, surface mounted) facing the mounting part 2a of the input side lead frame 2, on the mounting part 3a of the output side lead frame 3, and is covered by the translucent resin 7. With regard to the light receiving device 5, an emitter is electrically connected to the mounting part 3a and lead part 3b of the output side lead frame 3 via the bonding wire 9b, and a collector is electrically connected to the lead part 3c via the bonding wire 9c.

The transparent resin 6 is a transparent resin that covers the light emitting device 4 mounted on the mounting part 2a of the input side lead frame 2 (refer to FIG. 1 and FIG. 2). A transparent silicone resin may be used, for example, as the transparent resin 6.

The translucent resin 7 is a translucent resin that covers the mounting part 2a and some of the lead parts 2b and 2c (inner portion) of the input side lead frame 2, the transparent resin 6, the bonding wire 9a, the mounting part 3a and some of the lead parts 3b and 3c (inner portion) of the output side lead frame 3, the light receiving device 5, the bonding wires 9b and 9c, and the wire protrusion 10 (refer to FIG. 1 and FIG. 2). A translucent white epoxy resin may be used, for example, as the translucent resin 7.

The light-blocking resin 8 is a resin having a light blocking effect, which covers some of the lead parts 2b and 2c (middle portion) of the input side lead frame 2, some of the lead parts 3b and 3c (middle portion) of the output side lead frame 3, and the translucent resin 7 (refer to FIG. 1 and FIG. 2). A black epoxy resin may be used, for example, as the light-blocking resin 8.

The bonding wire 9a is wire that electrically connects an anode of the light emitting device 4 and the lead part 2c of the input side lead frame 2 (refer to FIG. 1, FIG. 2 and FIG. 3). The bonding wire 9a is covered by the transparent resin 6 at a portion close to the light emitting device 4, and is covered by the translucent resin 7 at other portions. Wire formed from gold, aluminum or copper, for example, may be used as the bonding wire 9a (the same applies to the bonding wires 9b and 9c, and the wiring protrusion 10).

The bonding wire 9b is wire that electrically connects an emitter of the light receiving device 5 and the mounting part 3a and the lead part 3b or the output side lead frame 3 (refer to FIG. 1, FIG. 2 and FIG. 4). The bonding wire 9b is covered by the translucent resin 7.

The bonding wire 9c is wire that electrically connects a collector of the light receiving device 5 and the lead part 3c of the output side lead frame 3 (refer to FIG. 1, FIG. 2 and FIG. 4). The bonding wire 9b is covered by the translucent resin 7.

The wire protrusion 10 is a protrusion formed by bonding wire. The wire protrusion 10 is provided in some of the area around the light receiving device 5 and with a gap from the light receiving device 5. With regard to the wire protrusion 10, the two ends of the bonding wire are connected (joined) to the mounting part 3a of the output side lead frame 3, and the middle portion of the bonding wire protrudes towards the mounting part 2b of the input side lead frame 2. The wire protrusion 10 is not in contact with the mounting part 2b. The wire protrusion 10 protrudes higher than the thickness of the light receiving device 5, and a protruding apex thereof is preferably sharp. The wire protrusion 10 is formed so as not to be disposed on a light path from the light emitting device 4 to the light receiving device 5. The wire protrusion 10 is preferably of the same material as the bonding wires 9b and 9c (and may also be the same material as 9a). The wire protrusion 10 may be formed in a process of forming the bonding wires 9b and 9c, since this enables a reduction in manufacturing cost.

Here, in improving a CMR (common mode rejection) characteristic by package structure design, the following may be considered: (1) reducing the amount of displacement current generated by a structure such that the capacitance between light emitting device and light receiving device is reduced, (2) reducing the amount of displacement current entering the light receiving device by releasing the displacement current. The structure of the photocoupler according to the first exemplary embodiment uses (2) above.

Figure 5:
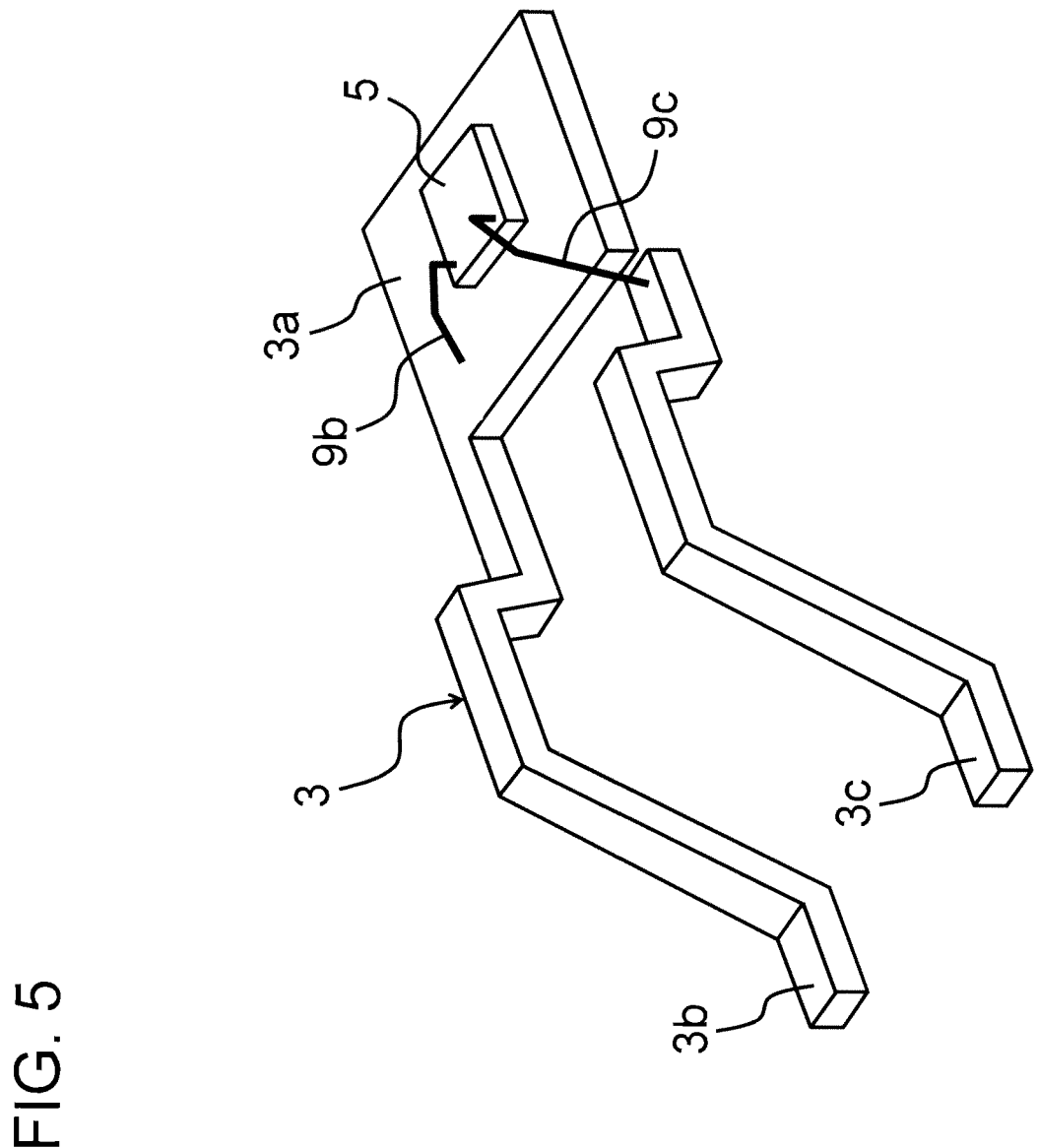
FIG. 5 is a perspective view schematically showing a configuration of an output side lead frame and a light receiving device in a photocoupler according to a comparative example.
Figure 6:
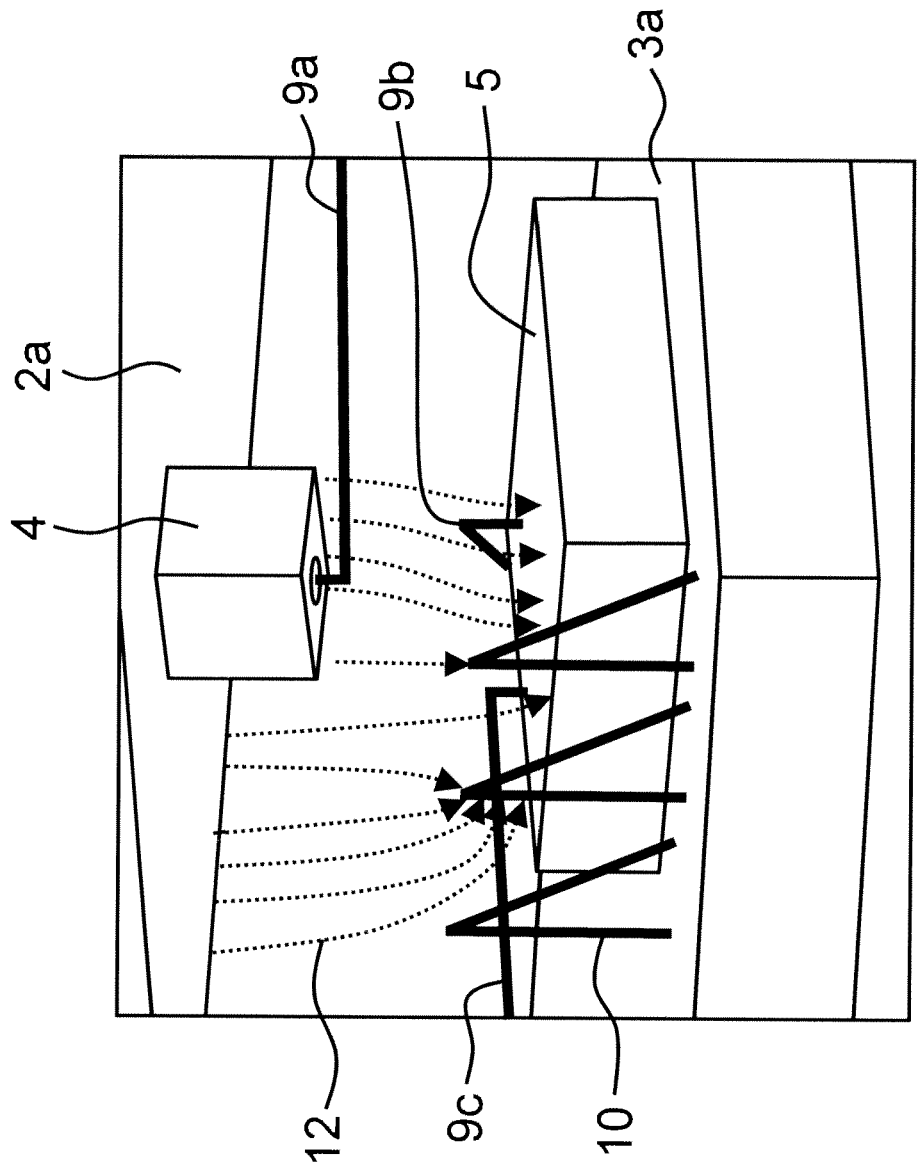
FIG. 6 is a diagram schematically showing a simulation result of an electric field vector in the photocoupler according to the first exemplary embodiment.
Figure 7:
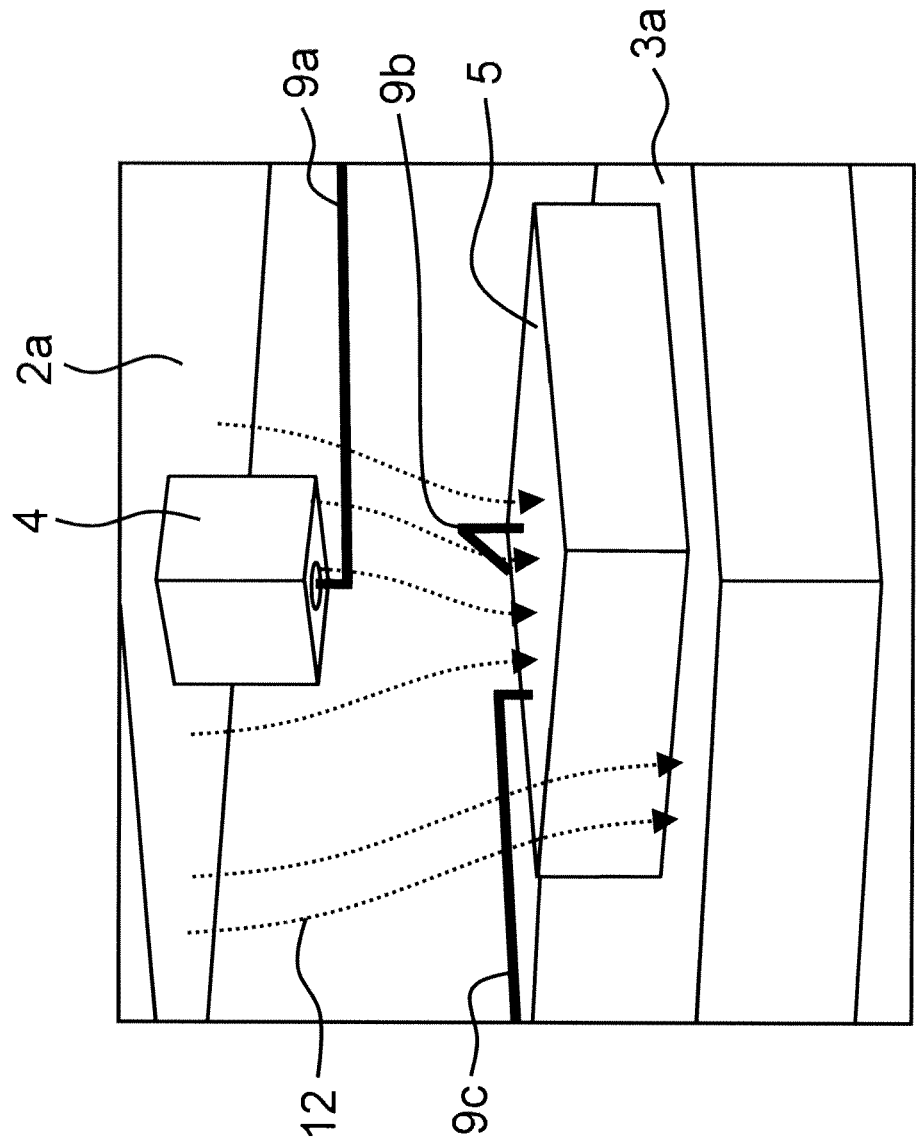
FIG. 7 is a diagram schematically showing a simulation result of an electric field vector in a photocoupler according to a comparative example.
Figure 8:
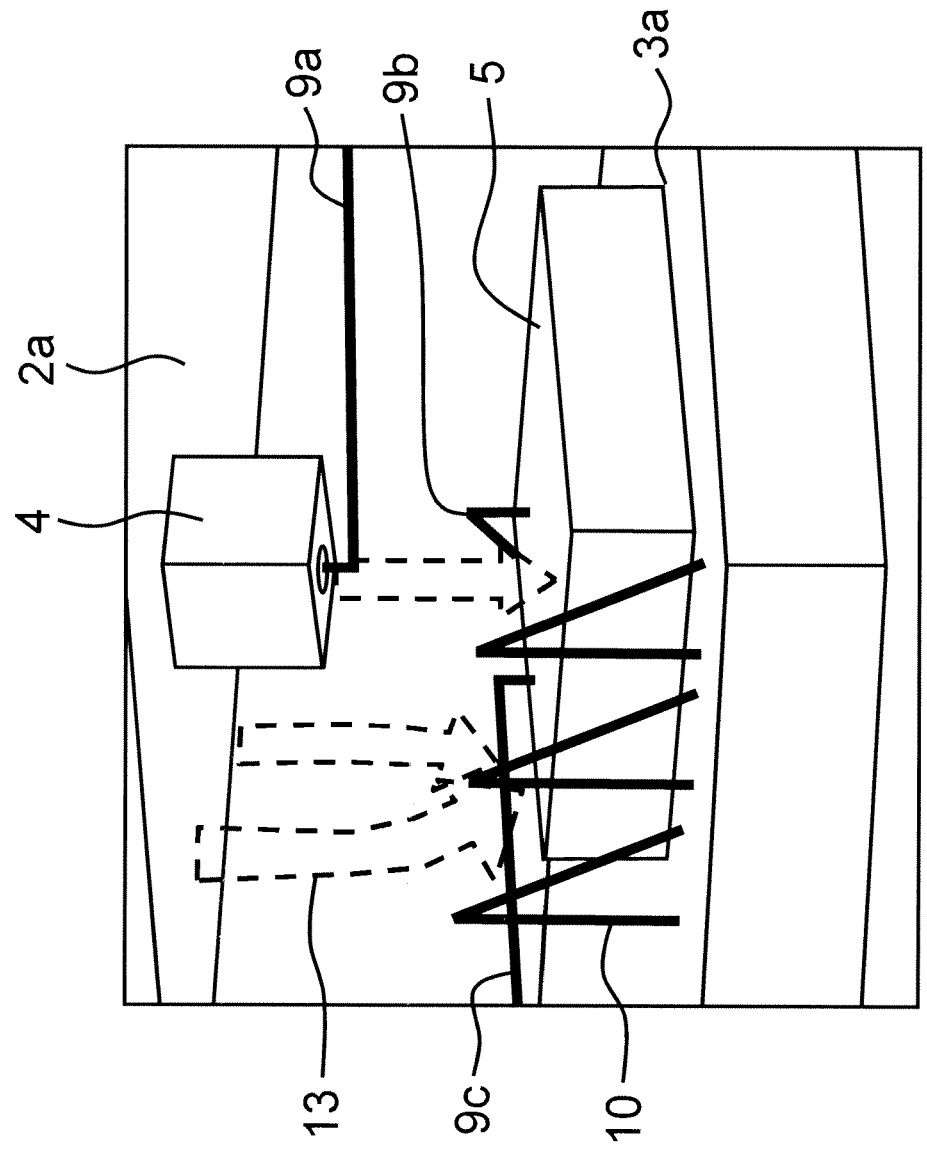
FIG. 8 is a diagram schematically showing a simulation result of an electric current vector in the photocoupler according to the first exemplary embodiment.
Figure 9:
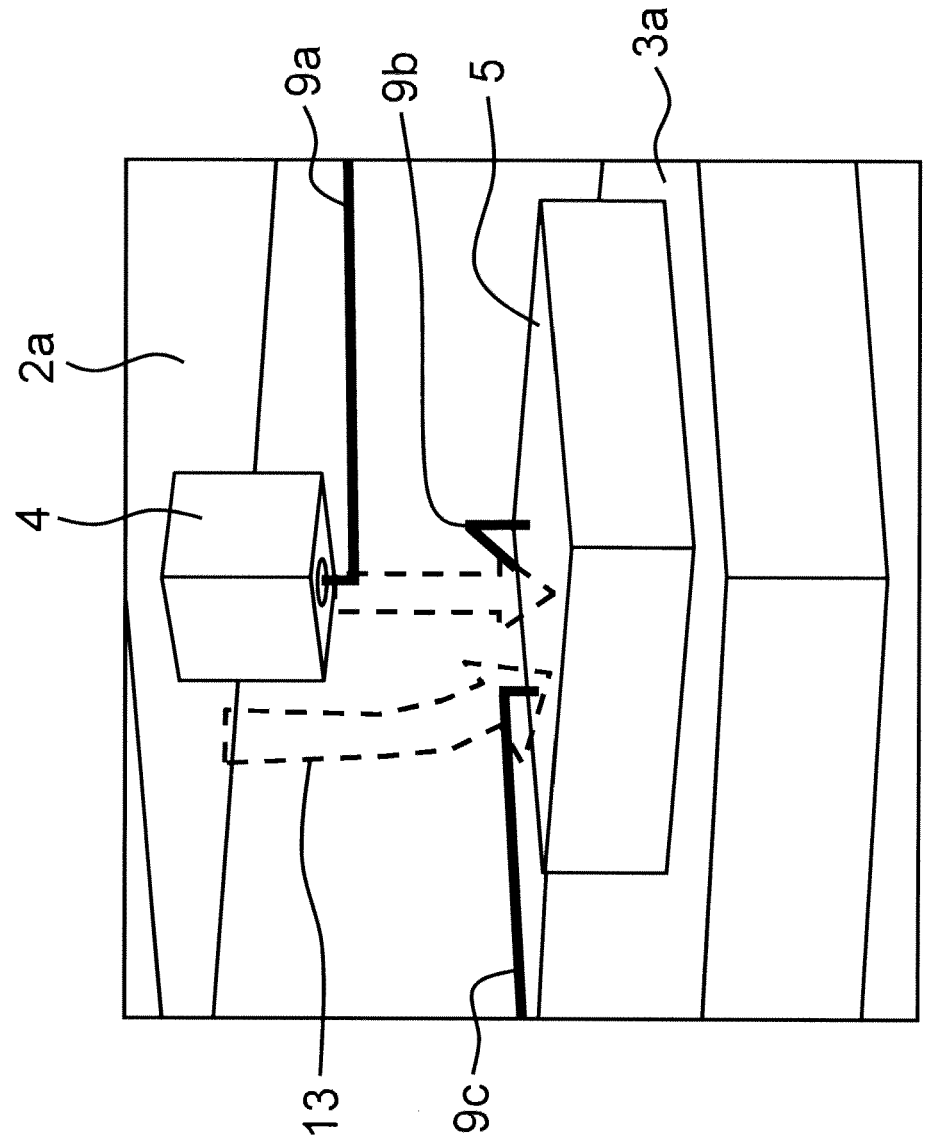
FIG. 9 is a diagram schematically showing a simulation result of an electric current vector in a photocoupler according to a comparative example.

Next, a description is given in which a comparison is made of a simulation result of an electric field vector and an electric current vector in the photocoupler according to the first exemplary embodiment, and a comparative example, making reference to the drawings. FIG. 5 is a perspective view schematically showing a configuration of an output side lead frame and a light receiving device in a photocoupler according to the comparative example. FIG. 6 is a diagram schematically showing a simulation result of an electrical field vector in the photocoupler according to the first exemplary embodiment. FIG. 7 is a diagram schematically showing a simulation result of an electric field vector in the photocoupler according to the comparative example. FIG. 8 is a diagram schematically showing a simulation result of an electrical current vector in the photocoupler according to the first exemplary embodiment. FIG. 9 is a diagram schematically showing a simulation result of an electric current vector in a photocoupler according to a comparative example.

Here, the comparative example has a structure (refer to FIG. 5) that does not have a wire protrusion (10 in FIG. 4), but the structure is otherwise the same as the first exemplary embodiment (refer to FIG. 1 to FIG. 3).

Verification was performed using a commercially available electromagnetic field simulator, concerning electric field vector, electric field distribution, electric current vector, current distribution, S parameters, package capacitance, and all amounts of displacement current, for the photocoupler.

Electric Field Vector, Electric Field Distribution

Referring to FIG. 7, in a case where no wire protrusion 10 is present as in the comparative example, a line of electric force is only a line of electric force 12 inputted to the light receiving device 5 or the mounting part 3a. On the other hand, referring to FIG. 6, in a case where the wire protrusion 10 is present as in the first exemplary embodiment, a line of electric force 12 inputted to the wire protrusion 10 is present, and from the electric field distribution the electric field is concentrated at the apex of the wire protrusion 10.

Electric Current Vector, Electric Current Distribution

Referring to FIG. 9, in a case where no wire protrusion 10 is present as in the comparative example, a displacement current path is only the displacement current path 13 inputted to the light receiving device 5. On the other hand, referring to FIG. 8, in a case where the wire protrusion 10 is present as in the first exemplary embodiment, a displacement current path 13 inputted to the wire protrusion 10 is present, and the displacement current path 13 inputted to the light receiving device 5 is decreased more than in the comparative example.

From the above, in the first exemplary embodiment, a displacement current flows to the wire protrusion 10 side and since the amount of displacement current entering the light receiving device 5 decreases, it is possible to improve the CMR characteristic.

According to the first exemplary embodiment, by providing the wire protrusion 10 connected to the output side lead frame 3, in a gap between the input side lead frame 2 and the output side lead frame 3, since the line of electric force is vertically incident with respect to an equipotential plane, the electric field is concentrated in the wire protrusion 10, and a displacement current flows also to the wire protrusion 10 side. As a result thereof, the displacement current entering the light receiving device 5 decreases, and it is possible to improve the CMR characteristic. Furthermore, since the wire protrusion 10 does not interrupt light entering the light receiving device 5 from the light emitting device 4, it is possible to maintain the CTR characteristic (ratio of output side photocurrent and input side forward current). In addition, since the wire protrusion 10 is formed by bonding wire, it is possible to form the wire protrusion 10 in a process in which the output side lead frame 3 and the light receiving device 5 are connected by the bonding wires 9b and 9c, and it is possible to reduce the cost of manufacturing the members.

Second Exemplary Embodiment

Figure 10:
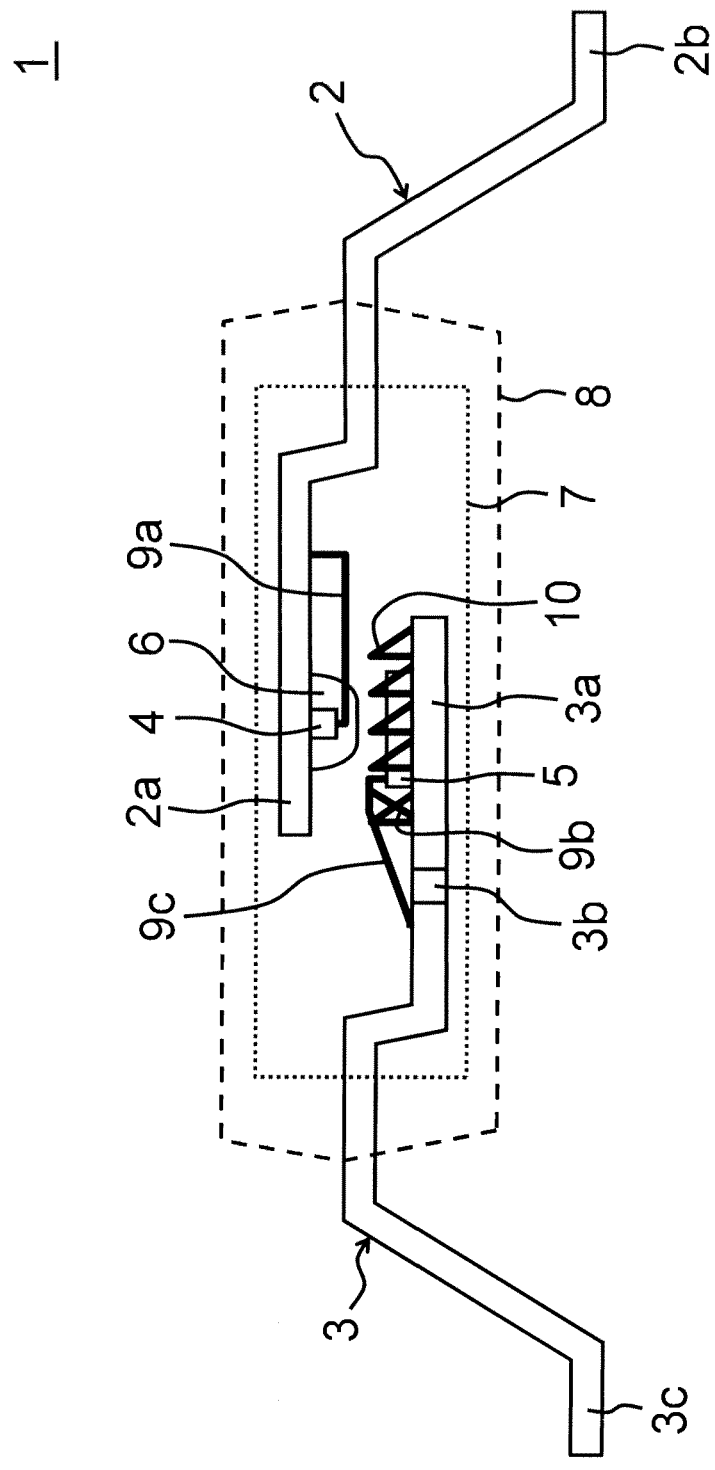
FIG. 10 is a side view schematically showing a configuration of a photocoupler according to a second exemplary embodiment.
Figure 11:
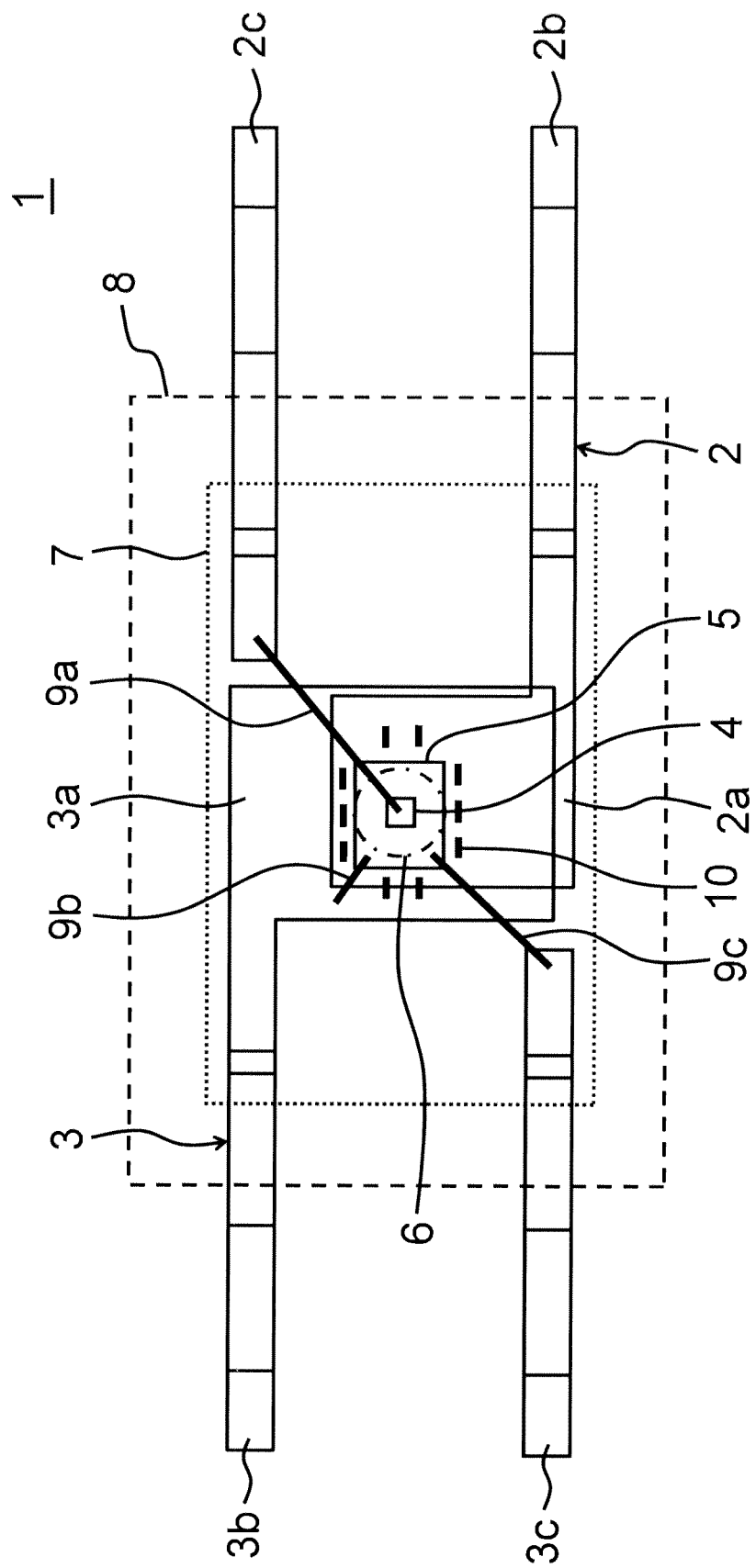
FIG. 11 is a plan view schematically showing a configuration of a photocoupler according to the second exemplary embodiment.
Figure 12:
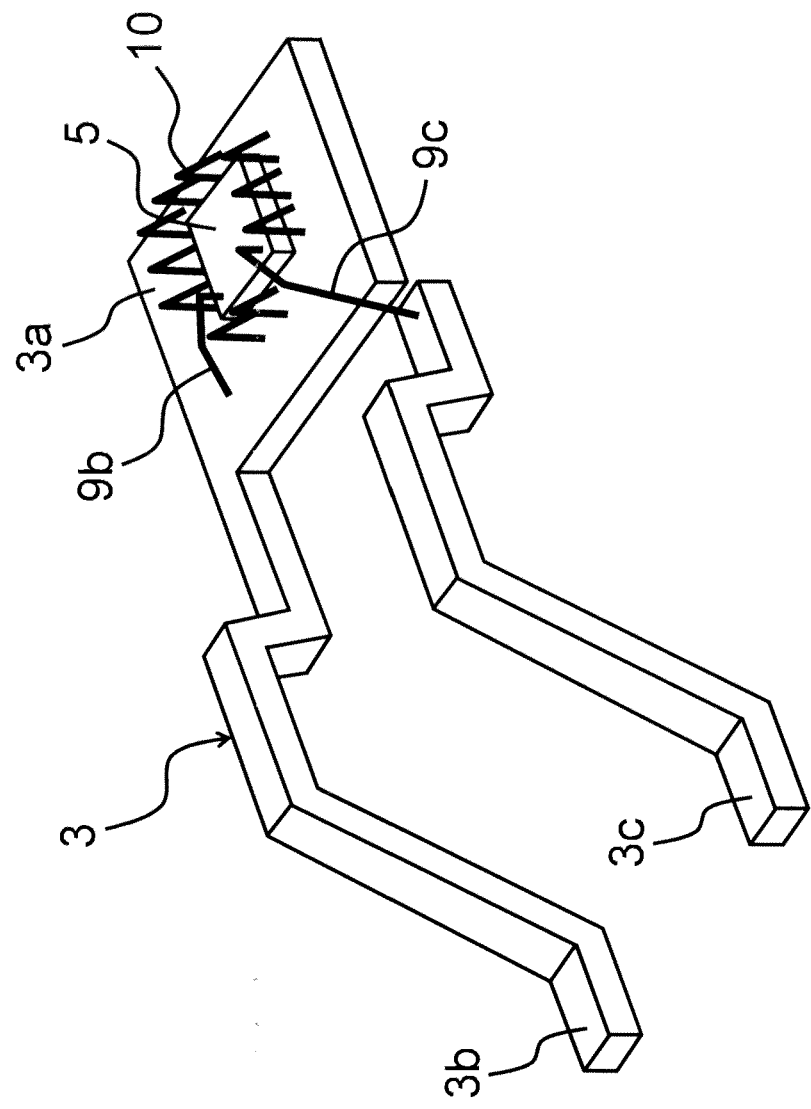
FIG. 12 is a perspective view schematically showing a configuration of an output side lead frame and a light receiving device in the photocoupler according to the second exemplary embodiment.

A description is given concerning a photocoupler according to a second exemplary embodiment of the present disclosure, making reference to the drawings. FIG. 10 is a side view schematically showing a configuration of the photocoupler according to the second exemplary embodiment. FIG. 11 is a plan view schematically showing a configuration of the photocoupler according to the second exemplary embodiment. FIG. 12 is a perspective view schematically showing a configuration of an output side lead frame and a light receiving device in the photocoupler according to the second exemplary embodiment.

The second exemplary embodiment is a modified example of the first exemplary embodiment, in which a wire protrusion 10 is provided in all of the area around the light receiving device 5, with a gap from the light receiving device 5. The configuration otherwise is similar to the first exemplary embodiment.

According to the second exemplary embodiment, in addition to realizing an effect similar to the first exemplary embodiment, it is possible to further reduce a displacement current entering the light receiving device 5, as compared to the first exemplary embodiment.

Third Exemplary Embodiment

Figure 13:
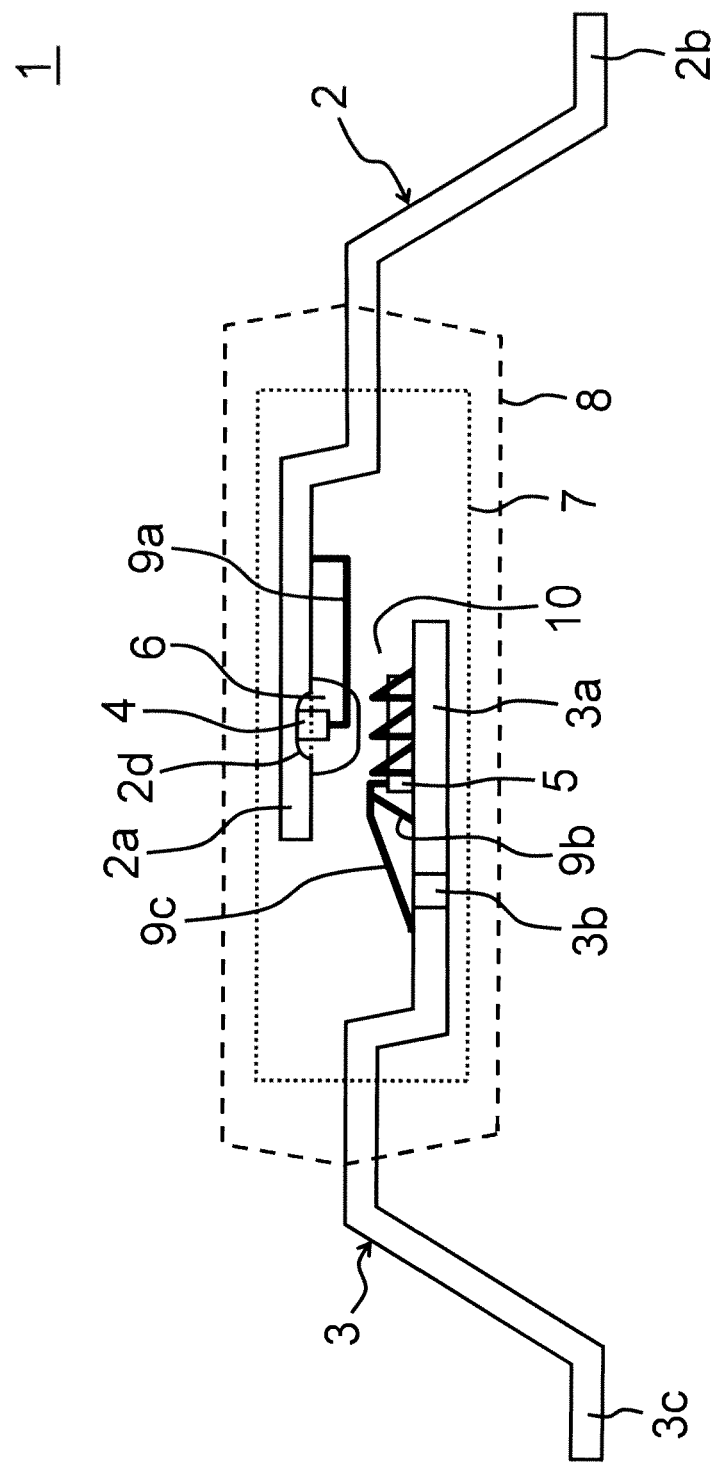
FIG. 13 is a side view schematically showing a configuration of a photocoupler according to a third exemplary embodiment.
Figure 14:
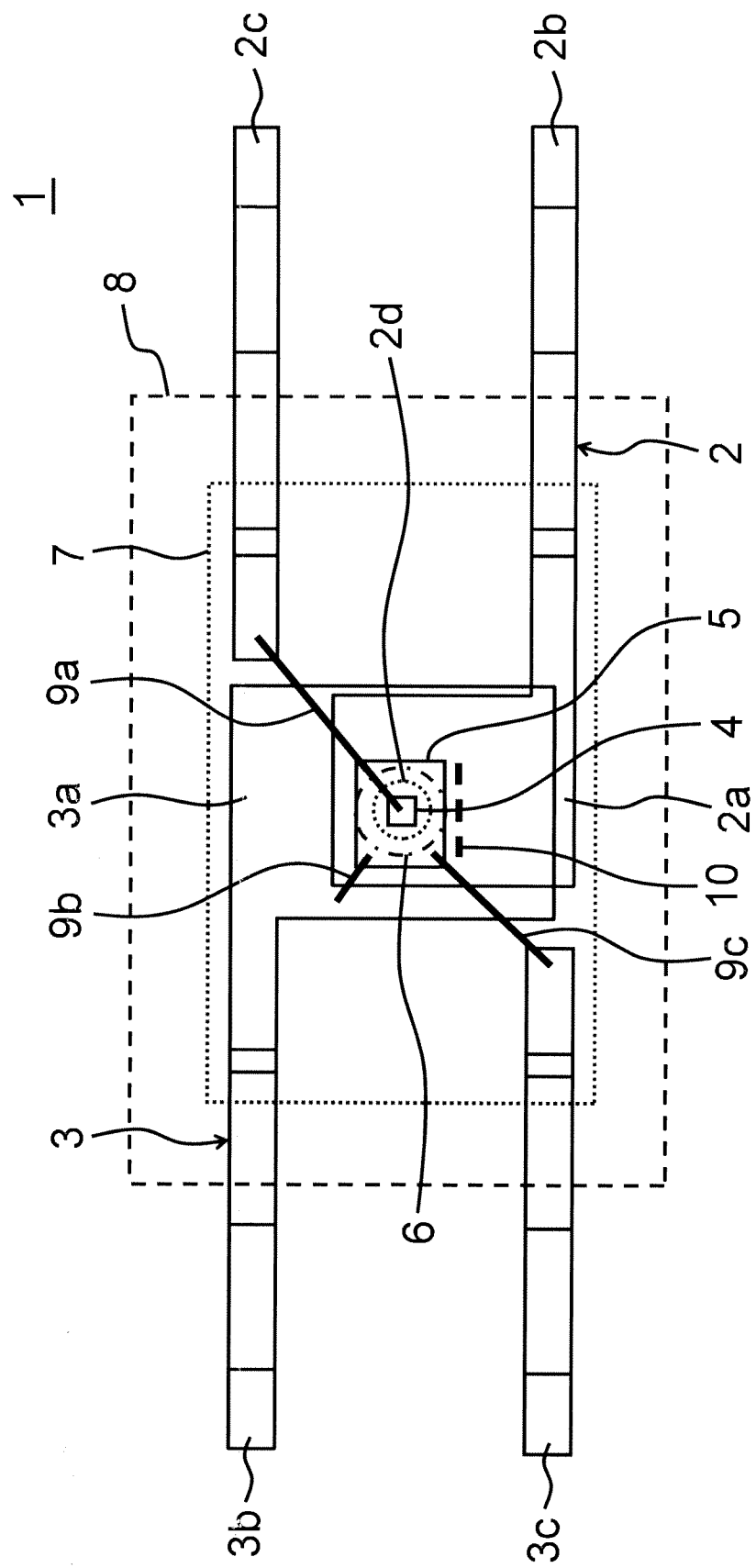
FIG. 14 is a plan view schematically showing a configuration of the photocoupler according to the third exemplary embodiment.
Figure 15:
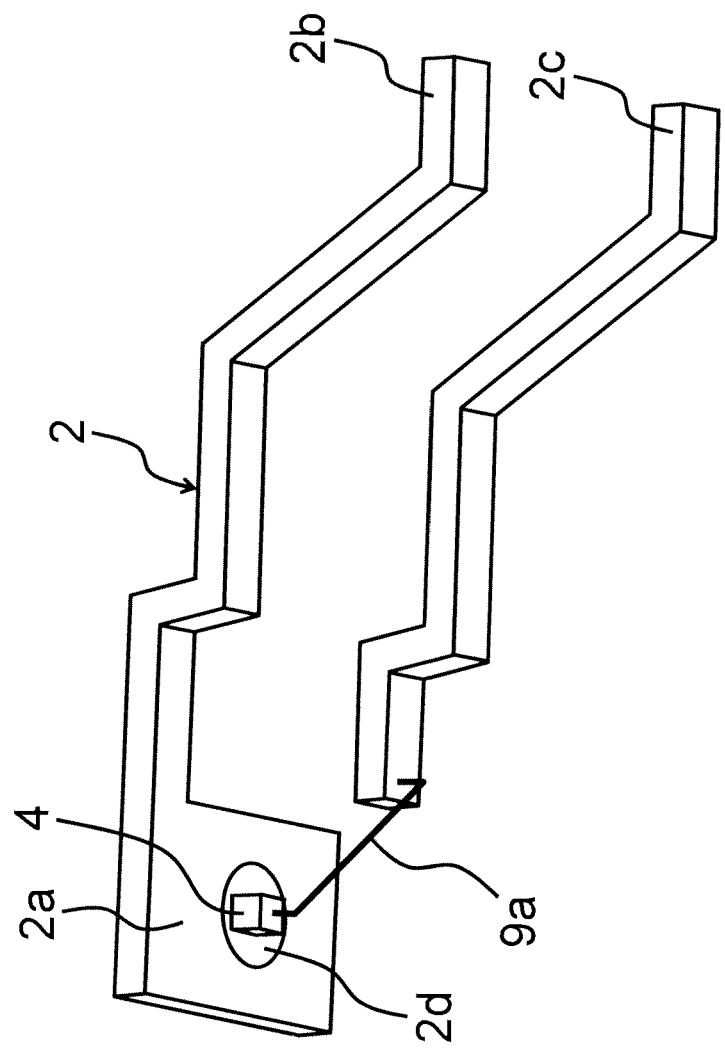
FIG. 15 is a perspective view schematically showing a configuration of an input side read frame and a light emitting device in the photocoupler according to the third exemplary embodiment.
Figure 16:
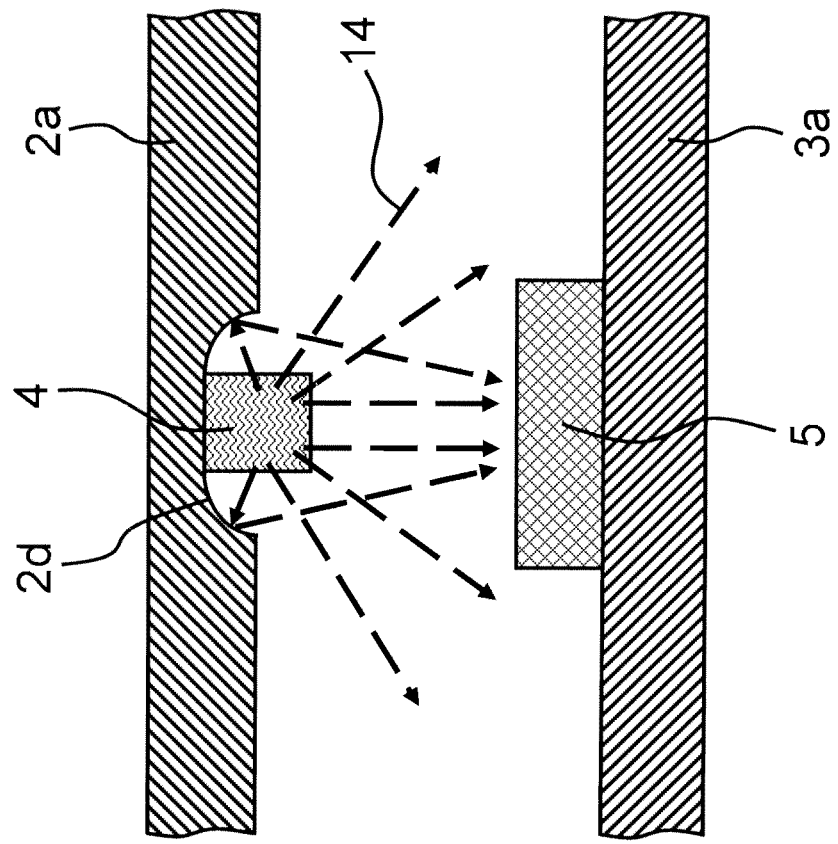
FIG. 16 is a diagram schematically showing a light path from a light emitting device in the photocoupler according to the third exemplary embodiment.

A description is given concerning a photocoupler according to a third exemplary embodiment of the present disclosure, making reference to the drawings. FIG. 13 is a side view schematically showing a configuration of the photocoupler according to the third exemplary embodiment. FIG. 14 is a plan view schematically showing a configuration of the photocoupler according to the third exemplary embodiment. FIG. 15 is a perspective view schematically showing a configuration of an input side lead frame and a light emitting device in the photocoupler according to the third exemplary embodiment. FIG. 16 is a diagram schematically showing a light path from the light emitting element in the photocoupler according to the third exemplary embodiment.

The third exemplary embodiment is a modified example of the first exemplary embodiment; the provision of a wire protrusion 10 in a mounting part 3a of an output side lead frame 3 is the same as the first exemplary embodiment, but a concave part 2d is provided, in which a mounting part 2a of an input side lead frame 2 is indented by etching or stamping at the time of manufacturing the lead frame, and a light emitting device 4 is mounted in the concave part 2d. By mounting the light emitting device 4 in the concave part 2d, light emitted from a side face of the light emitting device 4 can be made incident to the light receiving device 5 by reflection on a side face of the concave part 2d. A transparent resin 6 is provided as a filler so as to cover the light emitting device 4 in the concave part 2d. The configuration otherwise is similar to the first exemplary embodiment. It is to be noted that the second exemplary embodiment may also be applied to the third exemplary embodiment.

According to the third exemplary embodiment, similar to the first exemplary embodiment, since the CMR characteristic can be improved by the wire protrusion 10 and light emitted from a side face of the light emitting device 4 can be made incident to the light receiving device 5 by reflection in the side face of the concave part 2d, it is possible to improve the CTR (ratio of output side photocurrent and input side forward current) characteristic, as compared to the first exemplary embodiment.

Fourth Exemplary Embodiment

Figure 17:
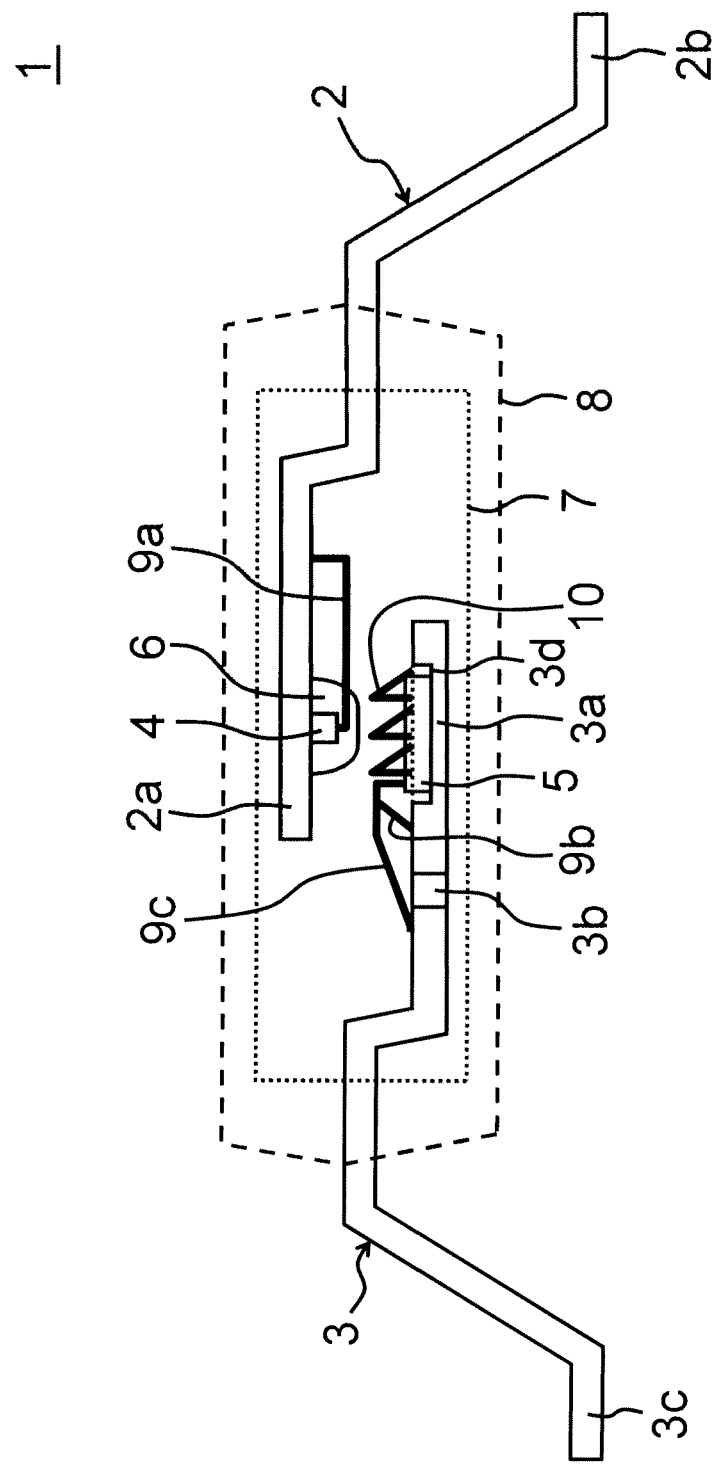
FIG. 17 is a side view schematically showing a configuration of a photocoupler according to a fourth exemplary embodiment.
Figure 18:
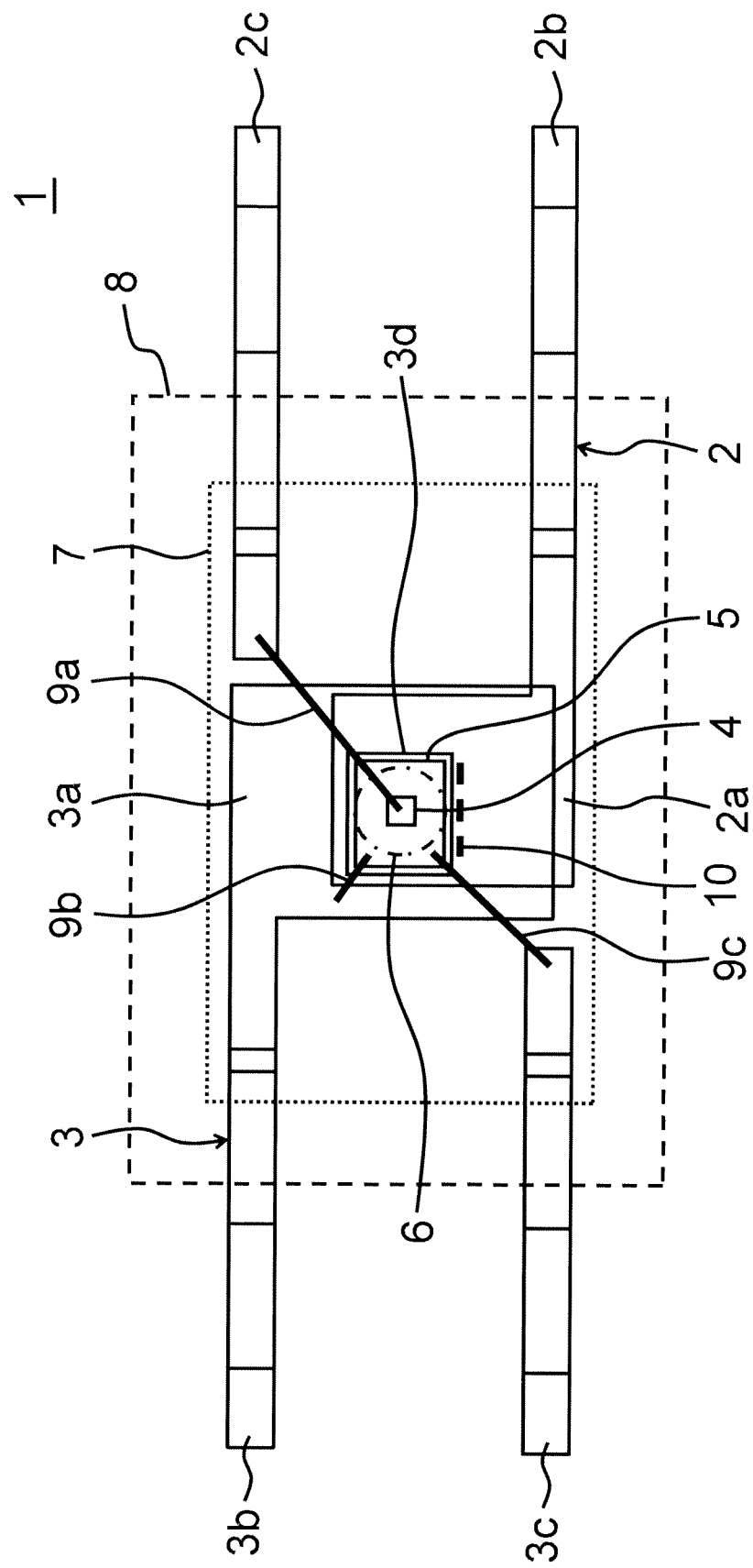
FIG. 18 is a plan view schematically showing a configuration of the photocoupler according to the fourth exemplary embodiment.
Figure 19:
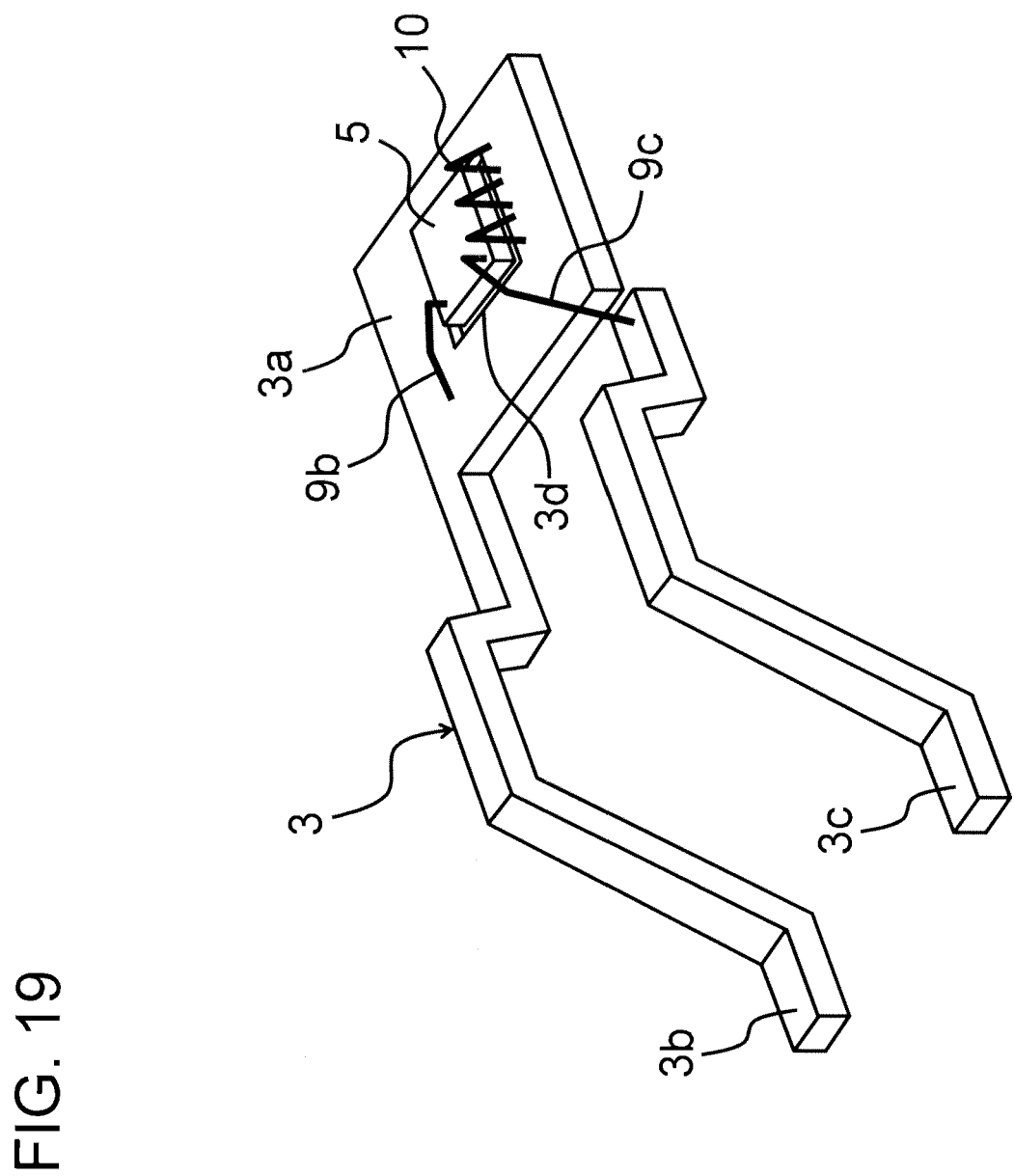
FIG. 19 is a perspective view schematically showing a configuration of an output side lead frame and a light receiving device in the photocoupler according to the fourth exemplary embodiment.

A description is given concerning a photocoupler according to a fourth exemplary embodiment of the present disclosure, making reference to the drawings. FIG. 17 is a side view schematically showing a configuration of the photocoupler according to the fourth exemplary embodiment. FIG. 18 is a plan view schematically showing a configuration of the photocoupler according to the fourth exemplary embodiment. FIG. 19 is a perspective view schematically showing a configuration of an output side lead frame and a light receiving device in the photocoupler according to the fourth exemplary embodiment.

The fourth exemplary embodiment is a modified example of the first exemplary embodiment; a concave part 3d is provided, in which a mounting part 3a of an output side lead frame 3 is indented by etching or stamping at the time of manufacturing the lead frame, a light receiving device 5 is mounted in the concave part 3d, and a wire protrusion 10 is provided in an area around the concave part 3d. A translucent resin 7 is provided as a filler so as to cover the light receiving device 5 in the concave part 3d. The configuration otherwise is similar to the first exemplary embodiment. It is to be noted that the second exemplary embodiment may also be applied to the fourth exemplary embodiment.

According to the fourth exemplary embodiment, the CTR characteristic is inferior due to the gap between the light emitting device 4 and the light receiving device 5 being large, but if the protrusion height is the same as in the first exemplary embodiment, with a light receiving face of the light receiving device 5 being far from the light emitting device 4, a displacement current flows easily to the wire protrusion 10, and it is possible to further improve the CMR characteristic in comparison with the first exemplary embodiment.

Fifth Exemplary Embodiment

Figure 20:
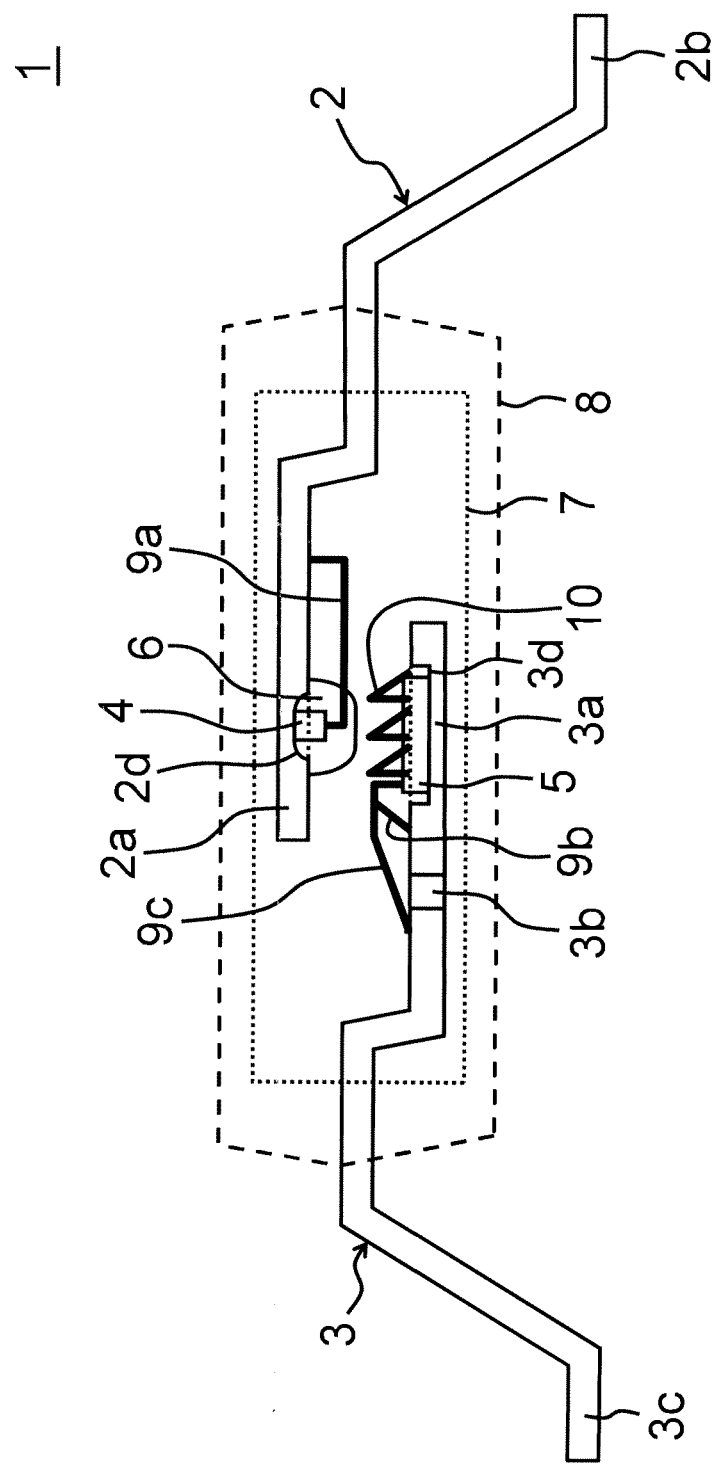
FIG. 20 is a side view schematically showing a configuration of a photocoupler according to a fifth exemplary embodiment.
Figure 21:
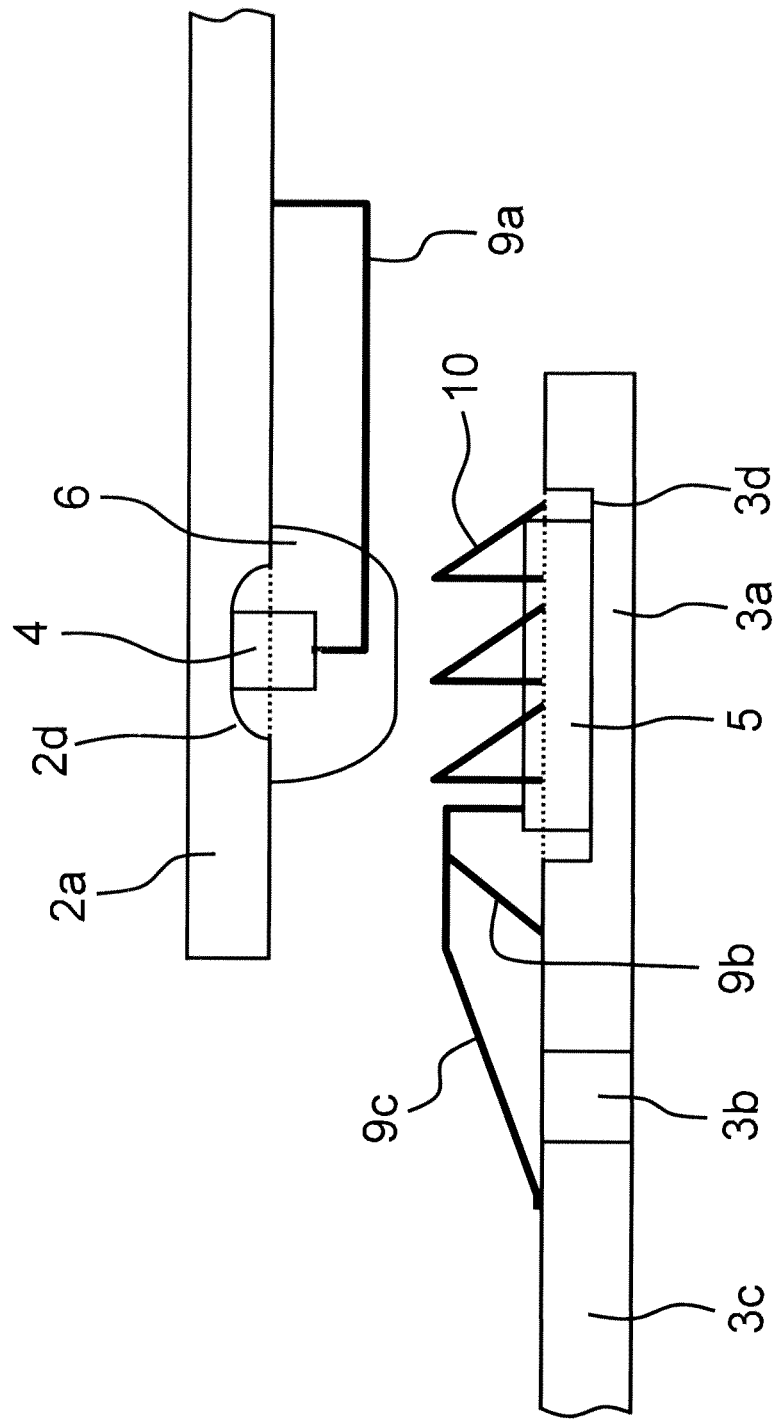
FIG. 21 is an enlarged side view schematically showing a configuration in the vicinity of photocoupler devices according to the fifth exemplary embodiment.

A description is given concerning a photocoupler according to a fifth exemplary embodiment of the present disclosure, making reference to the drawings. FIG. 20 is a side view schematically showing a configuration of the photocoupler according to the fifth exemplary embodiment. FIG. 21 is an enlarged side view schematically showing a configuration around devices of the photocoupler according to the fifth exemplary embodiment.

(Configuration)

The fifth exemplary embodiment is a modified example of the first exemplary embodiment, and is a combination of a concave part 2d of an input side lead frame 2 of the third exemplary embodiment and a concave part 3d of an output side lead frame 3 of the fourth exemplary embodiment. The configuration otherwise is similar to the first exemplary embodiment. It is to be noted that the second exemplary embodiment may also be applied to the fifth exemplary embodiment.

According to the fifth exemplary embodiment, effects of both the third exemplary embodiment and the fourth exemplary embodiment are obtained.

Sixth Exemplary Embodiment

Figure 22:
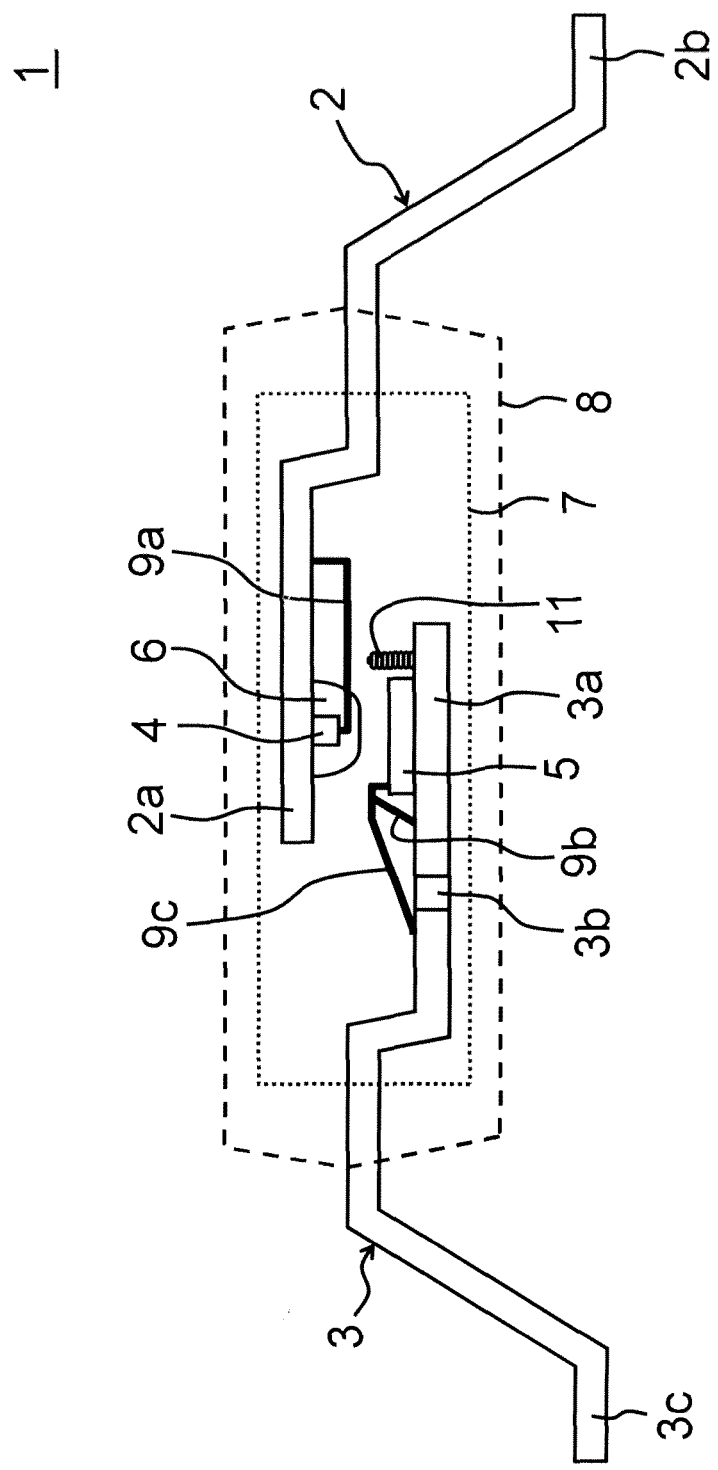
FIG. 22 is a side view schematically showing a configuration of a photocoupler according to a sixth exemplary embodiment.
Figure 23:
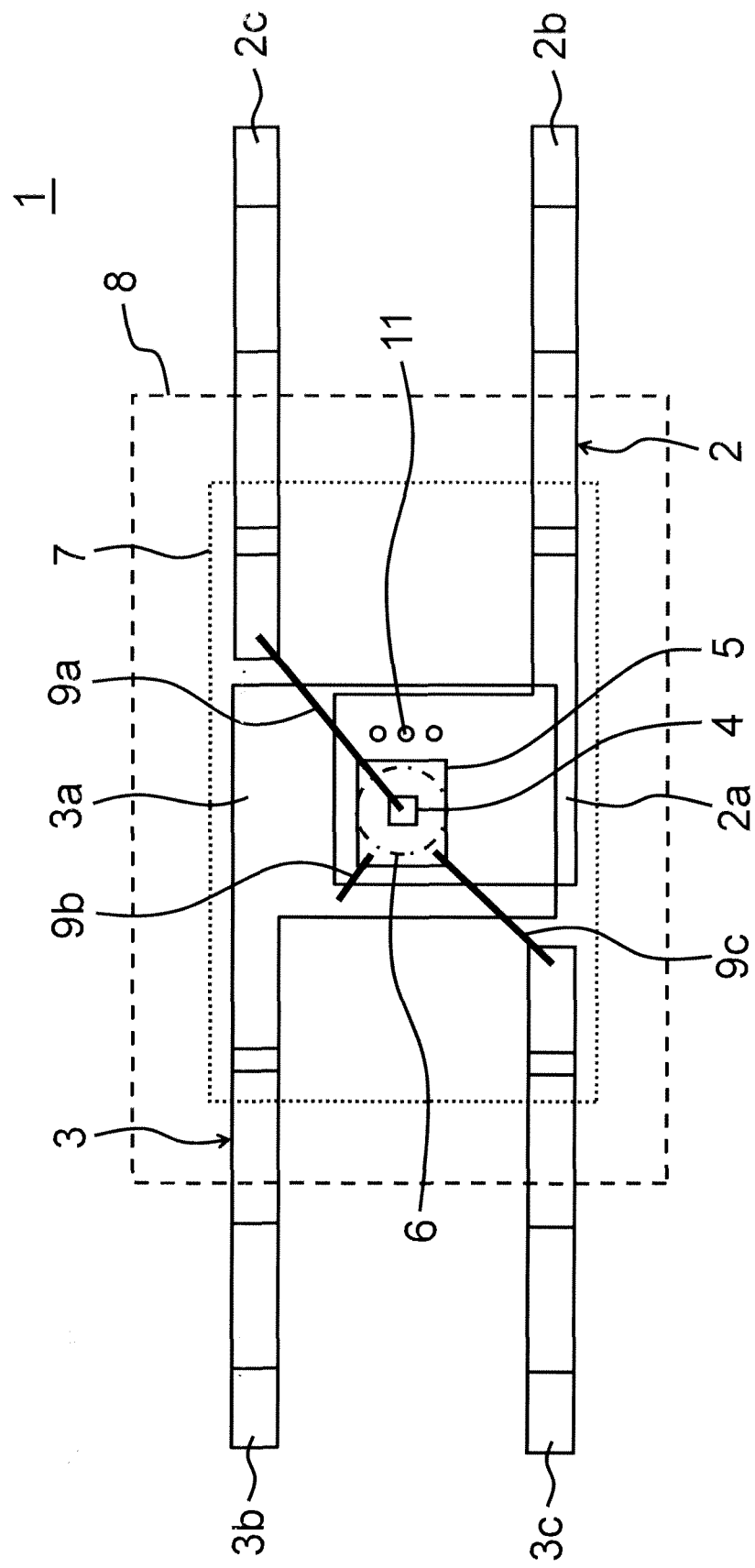
FIG. 23 is a plan view schematically showing a configuration of the photocoupler according to the first exemplary embodiment.
Figure 24:
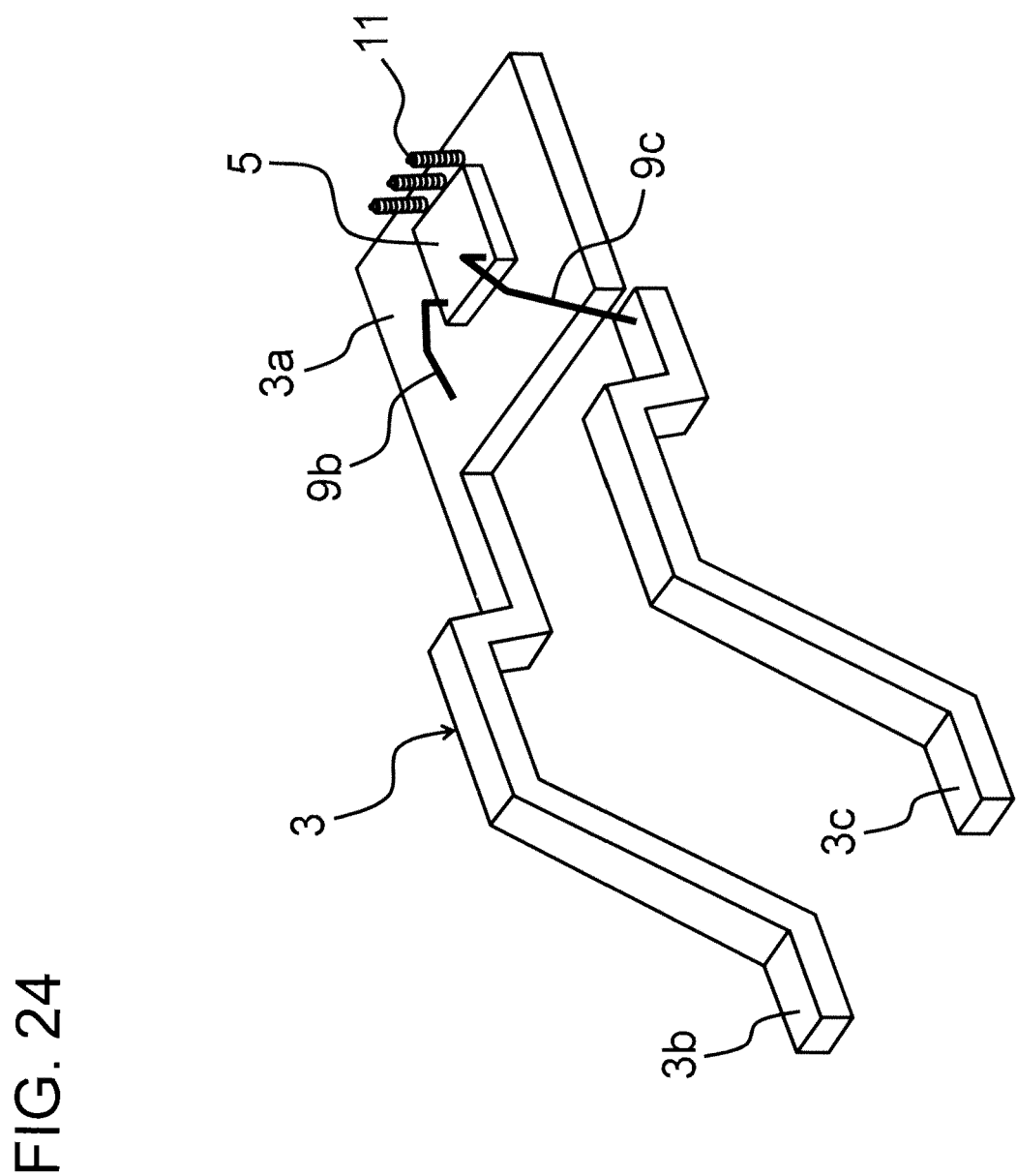
FIG. 24 is a perspective view schematically showing a configuration of an output side lead frame and a light receiving device in the photocoupler according to the sixth exemplary embodiment.

A description is given concerning a photocoupler according to a sixth exemplary embodiment of the present disclosure, making reference to the drawings. FIG. 22 is a side view schematically showing a configuration of the photocoupler according to the sixth exemplary embodiment. FIG. 23 is a plan view schematically showing a configuration of the photocoupler according to the sixth exemplary embodiment. FIG. 24 is a perspective view schematically showing a configuration of an output side lead frame and a light receiving device in the photocoupler according to the sixth exemplary embodiment.

The sixth exemplary embodiment is a modified example of the first exemplary embodiment, where, instead of a wire protrusion (10 in FIG. 1, FIG. 2 and FIG. 3) of the first exemplary embodiment, a bump protrusion 11 of stacked conductive humps is provided in some of the area around a light receiving device 5, with a gap from the light receiving device 5. The pump protrusion 11 is preferably higher than the thickness of the light receiving device 5, and an apex thereof is preferably sharp. A material such as Au, Ph/Sn alloy or the like, for example, may be used in the bump protrusion 11. The configuration otherwise is similar to the first exemplary embodiment. It is to be noted that the hump protrusion 11 of the sixth exemplary embodiment may also be used instead of the wire protrusion of the second to fifth exemplary embodiments.

According to the sixth exemplary embodiment, an effect similar to the first exemplary embodiment is realized.

The photocoupler according the abovementioned aspects is preferably as follows.

In the photocoupler, the protrusion protrudes higher than a thickness of the light receiving device.

In the photocoupler, the protrusion has an apex that is sharp.

In the photocoupler, the protrusion is disposed on a light path from the light emitting device to the light receiving device.

In the photocoupler, the input side lead frame has a first concave part on a face that faces the output side lead frame, and the light emitting device is mounted inside the first concave part.

In the photocoupler, the output side lead frame has a second concave part on a face that faces the input side lead frame, and the light receiving device is mounted inside the second concave part.

In the photocoupler, the photocoupler comprises a second bonding wire that electrically connects the light receiving device and the output side lead frame, wherein in a case where the protrusion is formed of bonding wire, the second bonding wire is of the same material as the protrusion.

In a case where reference symbols are attached to drawings in the present application, these are solely for aiding understanding and are not intended to limit the invention to modes shown in the drawings.

Modifications and adjustments of exemplary embodiments and examples are possible within the bounds of the entire disclosure (including the scope of the claims and the drawings) of the present invention, and also based on fundamental technological concepts thereof. Furthermore, multiple combinations and selections of various disclosed elements (including respective elements of the respective claims, respective elements of the respective exemplary embodiments and examples, and respective elements of the respective drawings) are possible within the scope of the claims of the present invention. That is, the present invention clearly includes every type of transformation and modification that a person skilled in the art can realize according to the entire disclosure including the scope of the claims and drawings and to technological concepts thereof.

What is claimed is:

1. A photocoupler, comprising:
   an input side lead frame;
   an output side lead frame disposed facing the input side lead frame with a gap therebetween;
   a light emitting device mounted on a face of the input side lead frame facing the output side lead frame side;
   a first conductive bonding wire electrically connecting the input side lead frame to the light emitting device;
   a light receiving device mounted on a face of the output side lead frame facing the input side lead frame side, opposite to and having a gap with the light emitting device;
   a second conductive bonding wire electrically connecting the output side lead frame to the light receiving device; and
   a protrusion disposed on at least a part of an area around the light receiving device on the output side lead frame and being formed of a third conductive bonding wire or a bump, protruding to the input side lead frame side,
   wherein the protrusion has an apex that is sharp,
   wherein the protrusion is separate from the first conducting bonding wire and the second conductive bonding wire such that the protrusion does not connect the input side lead frame to the light emitting device or the output side lead frame to the light receiving device,
   wherein the protrusion is formed of a plurality of third conductive bonding wires.

2. The photocoupler according to claim 1, wherein the protrusion protrudes higher than a thickness of said light receiving device.

3. The photocoupler according to claim 1, wherein the protrusion is formed so as not to be disposed on a light path from the light emitting device to the light receiving device.

4. The photocoupler according to claim 1, wherein
   the input side lead frame has a first concave part on a face that faces the output side lead frame, and
   the light emitting device is mounted inside the first concave part.

5. The photocoupler according to claim 1, wherein
   the output side lead frame has a second concave part on a face that faces the input side lead frame, and
   the light receiving device is mounted inside the second concave part.

6. The photocoupler according to claim 1, wherein
   the second conductive bonding wire is of a material identical to the protrusion.

7. The photocoupler according to claim 2, wherein the protrusion is formed so as not to be disposed on a light path from the light emitting device to the light receiving device.

8. The photocoupler according to claim 2, wherein
   the input side lead frame has a first concave part on a face that faces the output side lead frame, and
   the light emitting device is mounted inside the first concave part.

9. The photocoupler according to claim 2, wherein
   the output side lead frame has a second concave part on a face that faces the input side lead frame, and
   the light receiving device is mounted inside the second concave part.

10. The photocoupler according to claim 2, wherein
    the second conductive bonding wire is of a material identical to the protrusion.

11. The photocoupler according to claim 1, wherein the plurality of third conductive bonding wires are disposed along four sides of the light receiving device.

* * * * *